United States Patent [19]

Fettweis

[11] 4,326,288
[45] Apr. 20, 1982

[54] METHOD AND APPARATUS FOR FREQUENCY DIVISION MULTIPLEX SYSTEM

[75] Inventor: Alfred Fettweis, Bochum, Fed. Rep. of Germany

[73] Assignee: Siemens Aktiengesellschaft, Berlin & Munich, Fed. Rep. of Germany

[21] Appl. No.: 74,472

[22] Filed: Sep. 11, 1979

[30] Foreign Application Priority Data

Sep. 15, 1978 [DE] Fed. Rep. of Germany ....... 2840256

[51] Int. Cl.$^3$ .............................................. H04J 1/05
[52] U.S. Cl. ..................................... 370/70; 370/69.1
[58] Field of Search ............................ 370/70, 69, 50

[56] References Cited

U.S. PATENT DOCUMENTS

| | | | |
|---|---|---|---|
| 3,882,279 | 5/1975 | Duval et al. | 370/69 |
| 3,912,870 | 10/1975 | Roy | 370/70 |
| 3,919,671 | 11/1975 | Fettweis et al. | 333/70 R |
| 3,965,300 | 6/1976 | Markl | 370/69 |
| 3,967,099 | 6/1976 | Fettweis | 333/70 R |
| 4,011,905 | 12/1977 | Fettweis | 364/724 |

FOREIGN PATENT DOCUMENTS 2027303 9/1975 Fed. Rep. of Germany.
2263087 2/1977 Fed. Rep. of Germany.

OTHER PUBLICATIONS

"Proceedings IEE," vol. 117, No. 8, Aug. 1977, pp. 1585-1590.
"A New Method for Frequency-Division Multiplexing . . ." by Thrasher, "IBM Journal," Mar. 1965, pp. 137-139. "Techniques for the Digital Interfacing of TDM-FDM Systems," by Tomlinson et al., "Proceedings of the Institution of Electrical Engineers Electronics," vol. 123, No. 12, Dec. 1976, pp. 1285-1292.
"Proceedings IEEE Inter. Conf. on Communications," Chicago, Ill. Jun. 1977, pp. 195-199.
"IEEE Trans. on Communication Technology", vol. Com-19, No. 1, Feb. 1971, pp. 63-71.

Primary Examiner—Douglas W. Olms
Attorney, Agent, or Firm—Hill, Van Santen, Steadman, Chiara & Simpson

[57] ABSTRACT

A method for digital frequency conversion of audio signals or PCM signals into signals of a frequency-division multiplex system in which the original signals exist in a channel of limited band width. All channels are brought into their desired frequency ranges through simplified multiplication processes, using a basic operating rate having a frequency of six times the channel band width.

20 Claims, 26 Drawing Figures

4,326,288

METHOD AND APPARATUS FOR FREQUENCY DIVISION MULTIPLEX SYSTEM

FIELD OF THE INVENTION

The present invention relates to a frequency multiplex system, and more particularly to a method for digital frequency conversion of audio signals into frequency-division multiplex signals, or for frequency conversion of pulse code signals into frequency-division multiplex signals, the original signals existing within a limited channel width relative to the frequency band width.

THE PRIOR ART

In recent years, the problems of digital audio/FDM and PCM/FDM conversion have been given considerable attention and a series of different solutions has been proposed. Most of them are based on cancellation methods, i.e., signal suppression in undesired frequency ranges is obtained by means of cancellation signals which are formed in transmission paths specifically provided for that purpose. The high precision which is required is readily attributable but the necessary digital circuits are relatively expensive and complex. This is particularly true for arrangements which contain relatively complicated cancellation schemes such as, for example, those that are based on a fast Fourier Transform Algorithm (FFT). However, a considerable simplification can be achieved by means of such schemes which only need a multiplication by a factor of plus or minus unity (see Proceedings, IEEE International Conference on Communications, Chicago, Ill. June 1977), although the need for high precision filters or networks are just as stringent.

It is therefore desirable to specify methods and circuits in which these disadvantages can be completely eliminated by means of a suitable selection of the modulation steps and carrier frequencies.

BRIEF DESCRIPTION OF THE INVENTION

It is a principal object of the present invention to provide methods and circuits which result in a multiplication of the FDM processes.

In accordance with the present invention, it is possible to shift all channels into their respectively desired frequency range, so that only multiplication processes with the factors $+1$, $-1$ and $0$ are required. The same scheme can be employed for the conversion of audio into FDM signals just as well as for conversion of PCM into FDM signals.

Proceeding from the conventional frequency division multiplex (FDM) systems which make use of a multistage single path modulation method, the present invention generates signal samples in the case of audio/FDM conversion or, respectively, for PCM/FDM conversion, using an operating rate as the basic operating rate whose frequency position corresponds to the 6th multiple of the channel width.

These and other objects and advantages of the invention will become manifest upon an inspection of the following description and the accompanying drawings.

BRIEF DESCRIPTION OF THE DRAWINGS

Reference will now be made to the accompanying drawings, in which.

DESCRIPTION OF THE PREFERRED EMBODIMENTS

I. Introduction

Figure 1:
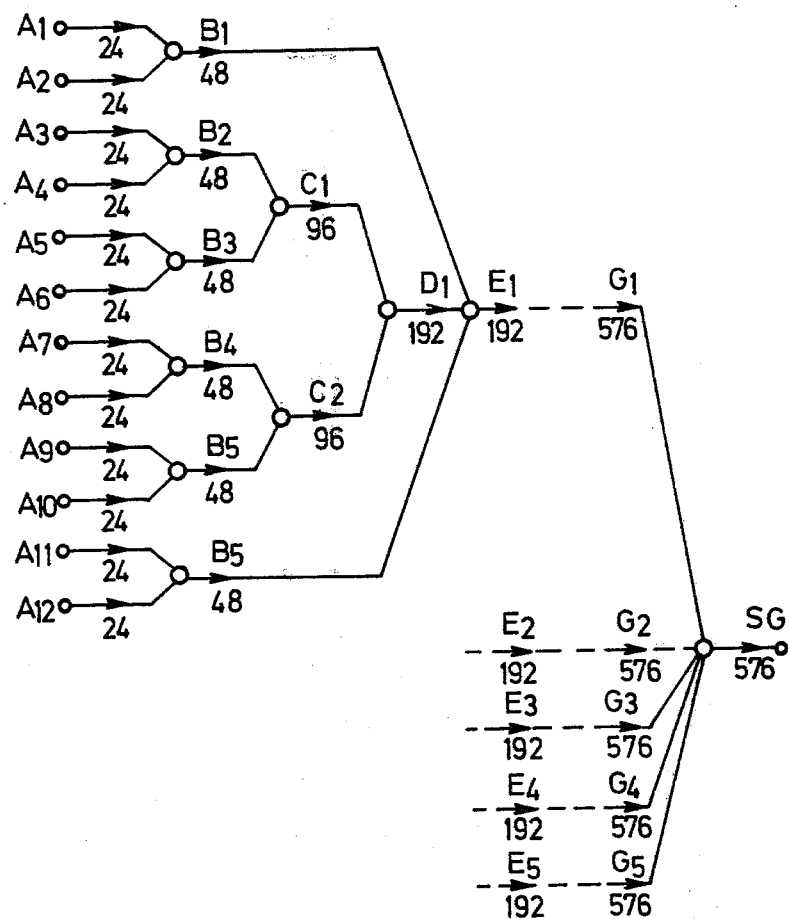
FIG. 1 is an illustration of a complete arrangement for a modulation pattern for generating a 60-channel super group SG.

Although several embodiments of the invention are possible, only arrangements for a 12 and a 60 channel system are described herein as illustrative of the invention.

In comparing FDM systems with each other, the multiplications which are required during a unit of time, and the precision with which the multiplications are carried out, are both of great importance. Another significant factor in such a comparison is the number of delay elements required. Although multipliers and adders in digital circuits can be shared among many channels in the so-called time-sharing method, this is not possible in delay elements, and accordingly, delay elements, although they are relatively inexpensive individually can become a decisive cost factor. Finally, the logical circuit structures which are also required cannot be ignored, and a consideration of costs must also include consideration of the power consumption of the circuits.

Although the present invention is described in terms of conventional filters, analog sampled data filters (filters consisting of switched capacitances) could alternatively be used, if desired.

2. Underlying Principles

2.1 Transmission and Reception Circuits

The discussion herein of the various modulation FDM patterns is to be limited here to the change-over from the audio range into the FDM range or, the change-over from PCM systems to FDM systems. It is apparent that the same pattern, even though only described for one direction, is also applicable for the change-over of FDM systems into the audio frequency range and also from FDM to PCM systems. As is also known from standard FDM systems, the detailed filter requirements, as a rule, are different for the two directions, but it is possible with relative ease to specify filter characteristics which meet the requirements arising for both transmission directions. In this case, the same type of circuit can be employed for both transmission directions.

2.2 Selection of the Carrier Frequencies

The carrier frequencies which are required for generating the various frequency conversions should be selected in such manner that the signals need only be multiplied with the numbers +1, −1, and 0 in the participating product modulators. This can be achieved by using only such carrier frequencies $f_c$ which amount either to ½, ⅓, ¼ or 1/6 of the sampling rate or operating rate F of the modulator under consideration.

If one considers multiplications with sine r cosine functions, the sequence of numbers involved is given by:

$$\sin(2\pi \nu f_c / F)$$

or $$\cos(2\pi \nu f_c / F)$$

in which
$\nu = \ldots -1, 0, 1, 2, \ldots$
The sine function then supplies the sequences:

$$f_c = F/3: \ldots -1, 0, 1, -1, 0, \ldots \quad (1)$$

$$f_c = F/4: \ldots -1, 0, 1, -1, 0, \ldots \quad (2)$$

$$f_c = F/6: \ldots -1, 0, 1, 1, 0, -1, -1, 0, \ldots \quad (3)$$

whereby the first and third sequence neglect a constant factor of $\sqrt{1.5}$.

The consine function supplies the sequences:

$$f_c = F/2: \ldots -1, 1, -1, 1, \ldots \quad (4)$$

$$f_c = F/3: \ldots -1, 2, -1, -1, 2, \ldots$$

$$f_c = F/4: \ldots 0, 1, 0, -1, 0, 1, \ldots \quad (5)$$

$$f_c = F/6: \ldots 1, 2, 1, -1, -2, -1, 1, 2, \ldots$$

the second and fourth sequences neglecting the factor 2. The sequences which require multiplications with +2 or −2 are not employed in the preferred embodiment of the present invention. Nonetheless, they can be almost equivalently employed because they only require arithmetic operations which can be executed relatively simply in a binary system.

The multiplications with the sequence defined by means of equation (4) call for, as is known (see C. F. Kurth, "SSB/FDM utilizing TDM digital filters", Transactions IEEE COM-19 (1971) 63-71), an inversion of the spectrum in each Nyquist interval. This operation is therefore of special significance and should not be regarded as multiplication; it is represented by the symbol "±". Although the sequences defined by equations (1) and (3) differ noticeably, it can be seen that each of them can generally be used in order to achieve the effect stated. Both sequences contain the same number of elements, namely 0, 1 and −1. Nonetheless, the sequence given by means of equation (1), which has the "length 3", is somewhat simpler than the sequence given by means of equation (3) and is therefore preferred. It would also be observed that a multiplication of equation (1) with equation (4) produces equation (3) with invention of operational sign, whereas equation (3) upon multiplication with equation (4) produces equation (1) with an inversion of the operational sign.

2.3 Selection of the Basic Work-Rate

All of the operating rates in the entire arrangement must be multiples of the basic operating rate i.e., the operating rate of the first filter section. Therefore, the selection of this rate is of special significance. It has been found, for several reasons, that a frequency of 24 kHz is particularly advantageous for this selection if one proceeds from a band width of 4 kHz of the original channels.

(a) Firstly, in a PCM/FDM conversion pattern, all operating rates must be multiples of the base PCM sampling rate of 8 kHz. For audio/FDM conversions, no such strict demand exists, although a series of simplifications can be obtained if all operating rates are multiples of 4 kHz. It is therefore advantageous to provide a pattern that can be used for both cases, in which all operating rates are at the same time multiples of 8 kHz.

For each channel, the most stringent filter requirements are made of the band pass filter which must filter out the sideband to be processed later. This filter should be operated at the lowest possible operating rate, since this assures the greatest possible relative filter band width and, thus, makes the lowest precision demands necessary for the filter coefficients, and offers the greatest opportunity to employ pre-selected filter circuits for many channels in a time-sharing process. On the other hand, the frequency range actually exploitable in a digital filter is equal to a Nyquist interval, i.e., is equal in width to half the operating rate. The lowest usable Nyquist interval must therefore be greater than the band width provided for a channel, i.e., the operating rate of a filter coming into consideration for this purpose can certainly not be lower than 12 kHz.

Figure 2:
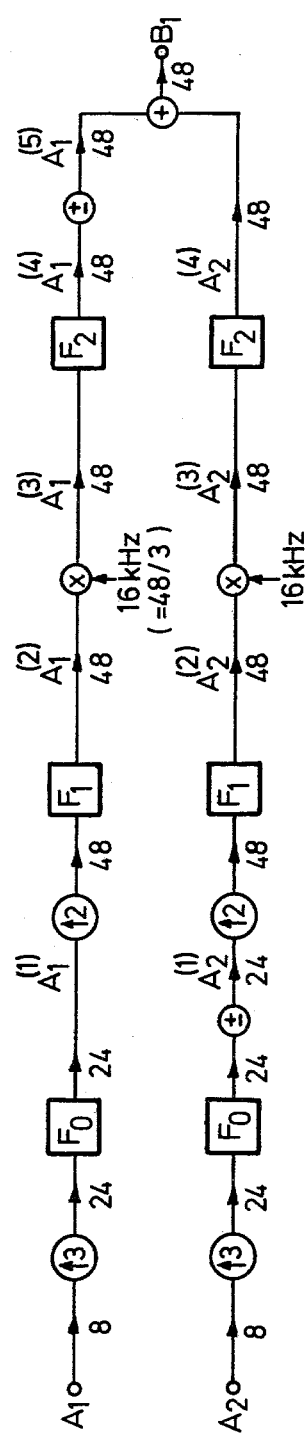
FIG. 2 shows a modulation pattern for generating the 2-channel sub-groups referenced in FIG. 1 with $B_1$ through $B_6$.
Figure 2:
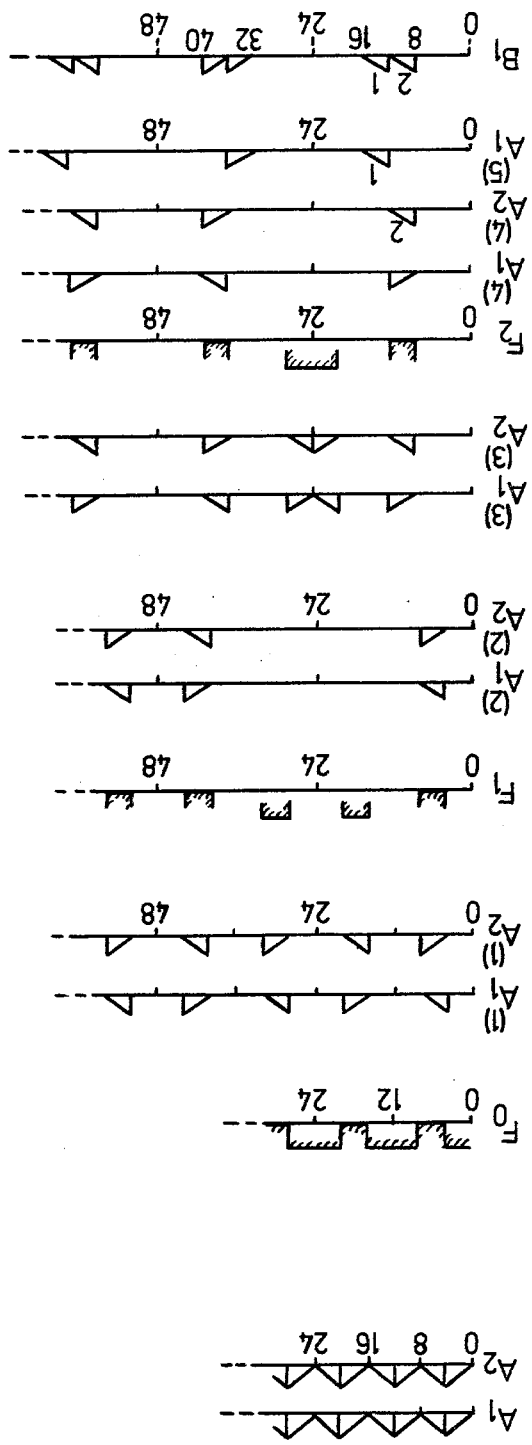

For PCM/FDM conversion, the spectral distribution of the decoded PCM signal is such as is illustrated, for example, for $A_1$ and $A_2$ in FIG. 2. It follows, therefore, that the lowest multiple of 8 kHz, namely 16 kHz, cannot be considered as the operating rate, because no band pass filter would fit in a Nyquist interval. This problem is avoided by using an operating rate of 24 kHz.

For audio/FDM modulation, the spectral distribution of the signal to be filtered depends on the carrier frequency which was employed for the preceding modulator and on the analog preliminary filter which is required in order to avoid undesired overlappings of the audio signal and a sideband of the modulation product. Such undesired overlappings, however, can only be avoided by means of filtering if the carrier frequency is at least equal to half the band width which is available per channel, i.e., in the example of 4 khz channel width, at least equal to 2 kHz. Since the Nyquist range must be greater than this value and, additionally, must at least have a width of one channel, the lowest operating rate in this respect is at least 16 kHz. The preliminary filtering, however, is considerably facilitated if one adopts a value of 24 kHz, instead.

(b) To a first approximation, it is desirable that the Nyquist interval be uniformly subdivided between the lower stop band, the passband and the upper stop band. For the Nyquist range, this leads to $3 \times 4 = 12$ kHz, and, accordingly, to 24 kHz for the lowest operating rate.

(c) Since it is preferred in the case of audio/FDM conversion to remain within the basic frame of 4 kHz interval, 4 kHz is the lowest possible modulation frequency. If, thereby, one wishes to observe the guidelines illustrated under Section 2.2 above, for a modulation without actual multipliers, the operating rate for the modulator could be either $2 \times 4 = 8$, $3 \times 4 = 12$, $4 \times 4 = 16$ or $6 \times 4 = 24$ kHz, whereby the respective Nyquist ranges to be correspondingly allocated are 4, 6, 8 and 12 kHz wide. Only the last value is usable, since it is the only one which offers sufficient space in order to incorporate the channel to be allowed to pass and also the lower and upper stop band in a Nyquist interval.

(d) Digital filters can be relatively easily arithmetically-symmetrically realized if the center frequency is equal to one-fourth of the work rate. Such filters have the advantage that they need only half the number of adders and multipliers (see "Proceedings Inst. Elec. Eng". 117 (August 1970, pages 1585-1590)). The lowest possible sideband that can be selected in the case of PCM/FDM conversion and which should be preferably selected also for audio/FDM conversion, lies in the range from 4 through 8 kHz, from which there derives, thus, a center frequency of 6 kHz. If one wishes to facilitate the use of digital filters as discussed above, the operating rate should be $4 \times 6 = 24$ kHz.

(e) Further, there is an advantage in using those group frequency ranges which coincide with the frequency ranges which are fixed for the five groups in a super group which are standard today, i.e., with frequency ranges which extend from 312 through 360, from 360 through 408, from 408 through 456, from 456 through 504 and from 504 through 552 kHz. In order to achieve this frequency position, it is useful if the basic sampling rate is a divisor of 312, 360, 408, 456, 504 and 552 kHz. The largest common divisor for these frequencies is again the frequency 24 kHz.

2.4 Selection of the Channel Numbers

In view of the hierarchic structure which is universally specified for FDM systems, a modulation pattern should be erected either for a primary group of 12 channels or a super group of 60 channels. The basic PCM system which, for example, is specified in the U.S.A. and Japan and provides 24 channels, is compatible in its channel number with the first selection (two primary groups for a PCM system), but not with the second (60 cannot be divided by 24). On the other hand, the PCM system employed in Europe, i.e., a system with 30 channels, is not compatible in its channel number with the first selection but is with the second (two PCM systems for a super group).

There is also an advantage in employing the smallest possible number of actual filter circuits and to operate these for the largest possible number of channels in a time-sharing mode. In particular, it would be useful to have only one filter circuit for all filters with the most stringent demands in a system. If one adopts a basic operating rate of 24 kHz, as discussed above, this would lead to an operating rate of a total of $60 \times 24 \times 10^3 = 1.44$ MHz for a 60 channel system.

The number of bits required per sample lies approximately between 20 and 25. The bit rate at which the logical circuit parts must function accordingly lies between $20 \times 1.44 = 28.8$ M bits/sec and $25 \times 1.44 = 36$ M bits/sec. These rates can readily be achieved with conventional present-day equipment.

For these reasons, it is practical to specify 60 channels for a system. In order to preserve flexibility, such a system should preferably be subdivided into 12 individual channel groups.

2.5 Selection of the Number of Modulation Steps

In Section 2.3 (a) above, it was pointed out that the required filtering should take place at the lowest possible rate. This principle should be observed not only for the first filter stage, the filter with the most stringent demands, but, insofar as possible, also for all further filter stages. This means that the increase in operating rate should be carried out in the smallest possible steps. This in turn requires that the factor with which the basic operating rate must be multiplied in order to arrive at a subsequent operating rate must be composed of prime factors which are as small as possible, preferably 2 or 3.

The factor 2 is also advantageous because it then becomes possible to employ directional filters in view of the simultaneous doubling of the number of channels. A directional filter is composed of a pair of complementary filters which have a common terminal, one filter having its pass band where the other has its stop band, and vice versa. A wave digital filter is a directional filter, since the two transfer functions which one obtains between an input terminal and the two output terminals are complementary, as is known. This can lead to a saving in circuit structures.

In a 60 channel system, one strives to achieve the final range of the basic super groups, i.e., the frequency range of 312-552 kHz in a direct manner. If one adopts the basic operating rate in the manner discussed in Section 2.3 above, then all operating rates must be multiples of 24 kHz. On the other hand, because of the sampling theorem, the scanning rate for the frequency range of 312–552 kHz in the specific case corresponding, for example, to FIG. 16 must be greater than 552 kHz but smaller than $2 \times 312 = 624$ kHz. Accordingly, there are two possibilities of 576 kHz and 600 kHz. Of these two, the former is $2 \times 2 \times 2 \times 3 \times 24$ kHz; the second is $5 \times 5 \times 24$ kHz. Accordingly, the first selection is to be preferred.

Finally, a second criterion should be taken into consideration, according to which the two possibilites referred to above are approximately equally good. Namely, it is necessary to provide a conventional analog filter after the final digital to analog (D/A) conversion. The critical values for this filter are the respective relative width of the upper and lower transition regions between the pass band and the stop bands. For 576 khz, the corresponding values are $2(576-552)/576 = 0.0833$; $2(312-288)/288 = 0.1667$; and for 600 kHz, these values correspond to $2(600-552)/600 = 0.16$ and $2(312-300)/300 = 0.08$. These numbers differ from each other only slightly, since in the first case, the upper transition region is more critical and, in the second case, the lower transition region is more critical.

For the 12-channel system, the basic group which is most desirable is between 60 and 108 kHz. There is no multiple of 24 kHz which is suitable. Accoridngly, one must make a frequency selection which is different from that of the basic group. The selection which leads to the lowest possible scanning rate is a frequency which lies between 64 and 112 kHz, with an operating rate of $5 \times 24 = 120$ kHz. The solution which one achieves in this manner is not entirely as elegant as that for the 60-channel system. Nonetheless, for the filter following the D/A conversion, the relative widths for the upper and lower transition region are now the same $(16/20 = 8/60 = 0.133)$, which is optimal.

3. Description of the Modulation Pattern 3.1 Symbols and Designations

Several different symbols are employed in the drawings. $F_0$, $F_1$ through $F_{13}$ signify filters. By way of example, the designation $\tilde{F}_2$ refers to a filter which has a similar function as $F_2$, but which is employed in a different arrangement for generating the same spectra. By way of example, these designations $F_1^2$, $F_2^2$ and $\tilde{F}_2^2$ point out that the corresponding filters are accordingly the same as the filters $F_1$, $F_2$ and $\tilde{F}_2$, but that their operating rate is twice as high. In the same fashion, the filters designated with $F_1^4$, $F_2^4$ and $\tilde{F}_2^4$ are again the same as those designated with $F_1$, $F_2$ and $\tilde{F}_2$ however, they are operated with four times the operating rate. Pass band and stop band of filters are represented in the standard manner. In frequency ranges for which neither pass band range nor stop band symbols are specified, no kind of attenuation requirements need be specified. A designation such as, for example, $\bar{F}_1$ refers to a filter which is complementary to a filter designated with $F_1$. A directional filter is illustrated as a pair of complementary filters within a block diagram which has a common output terminal.

Numbers under signal arrows in the illustrated flow charts refer to the sampling rate with which the respective signal appears at this location. A small arrow pointing vertically toward the top within a circle indicates that the sampling rate is increased by the factor which stands directly next to the arrow. This increase is generated by filling with zeros, all newly introduced sampling instants. A modulator is identified by means of a multiplication sign without a circle, and the modulation signal and its frequency are shown as a separate arrow. A multiplication with the sequence defined by means of equation (4), i.e., an inversion of operational sign for each second sample, is illustrated by means of the symbol "±" within a circle.

3.2 60-Channel System

The general pattern according to which the modulation or, respectively, conversion is carried out, is illustrated in FIG. 1. 12 individual channels $A_1$ through $A_{12}$ with the sampling rate of 8 kHz in the case of PCM/FDM conversion, and 24 kHz in the case of audio/FDM conversion, are first gathered together in six 2-channel sub-groups $B_1$ through $B_6$, and a sampling rate of 48 kHz is provided for that purpose. The sub-groups $B_2$ through $B_5$ are then gathered together into two 4-channel sub-groups $C_1$ and $C_2$ at a scanning rate of 96 kHz, and then into a single 8-channel sub-groups $D_1$ for which a sampling rate of 192 kHz is provided. This latter is in turn combined with $B_1$ and $B_6$ to form a 12-channel group $E_1$ and a scanning rate of 192 kHz is employed for this purpose. In a corresponding manner, the groups $E_2$ through $E_5$ are formed which, thus, all occupy the same frequency range. In the next step, the groups $E_1$ through $E_5$ are directly individually modulated and/or filtered so that they achieve the desired final position for the bands $G_1$ through $G_5$, i.e., corresponding to the frequency bands 312 through 360, 360 through 408, 408 through 456, 456 through 504, and 504 through 552 kHz—whereby a sampling rate of 576 kHz is provided; the basic super group SG for which a scanning rate of 576 kHz is employed is then generated by means of the combination of $G_1$ through $G_5$.

In a further arrangement which is not illustrated in FIG. 1, $G_1$, $G_3$ and $G_5$ can be formed in common from $E_1$, $E_3$ and $E_5$, and $G_2$ and $G_4$ can be formed in common from $E_2$ and $E_4$, and the results therefrom can be used for the formation of the super group SG.

Figure 3:
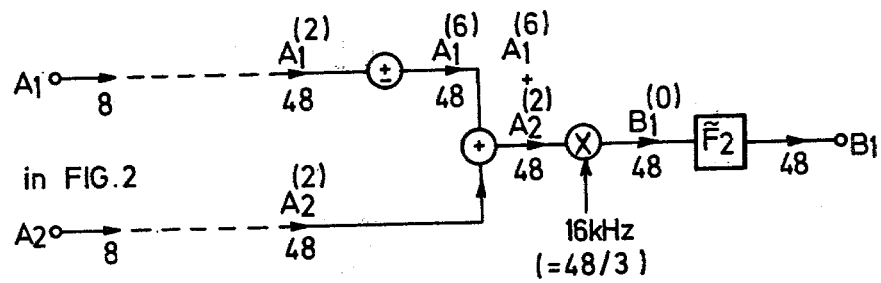
FIG. 3 shows a further arrangement for generating $B_1$ or, respectively, $B_2$ through $B_6$.
Figure 3:
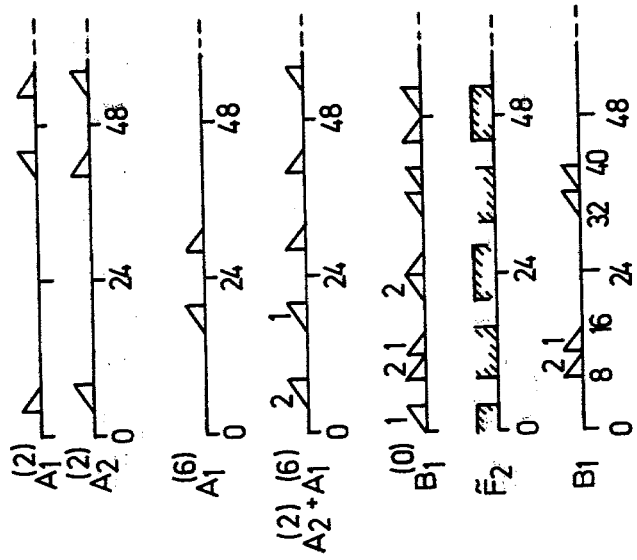

The details for the above method are indicated in FIGS. 2 through 18b. In these figures, a block diagram of the apparatus is shown, and shown adjacent thereto is the spectra of the signals at corresponding locations of the apparatus. The frequency ranges are indicated for the pass bands and the stop bands of the filters. The signals which appear at intermediate locations of the circuits are designated in the block diagram with $A_1^{(1)}$, $A_1^{(2)}$, ..., $B_1^{(1)}$, ... etc. All modulation frequencies are selected in such manner that only multiplications with $+1$, $-1$ and 0 are required in the modulators. The circuits shown in FIGS. 2 and 3 are particularly illustrated for the case of PCM/FDM conversion. When this apparatus is used for audio/FDM conversion, the increase for the sampling rate by the factor 3 which occurs immediately at the start is omitted.

Specific parts of the pattern are shown in FIGS. 3, 4, 5a, 6, 7a, 8, 10, 17 and 18, most of which contain directional filters as in FIGS. 4, 6, 8, 10, 17 and 18. For generating the sub-groups $C_1$ and $D_1$, apparatus similar to that of FIG. 3 for generating $B_1$ can be used. Other apparatus may also be used. For example, it is possible to employ a modulation frequency with 1/6 of the operating rate instead of a frequency which is equal to ⅓ of the operating rate, if a few simple suitable modifications are employed.

In the drawings, numbers between 1 and 12 indicate which of the individual channels $A_1$ through $A_{12}$, or which of the groups $E_1$ through $E_5$ occupy the spectral position.

The filters $F_1$ and $F_2$ or, respectively $\widetilde{F}_2$ etc., are not only employed for generating $B_1$, but, rather, also for generating $C_1$ or, respectively, $D_1$, however, accordingly, with a doubled or, respectively, four-fold operating rate (filters $F_1{}^2 \ldots$ etc.,). For manufacturing such filters which belong to the same family such as, for example, filters $F_1$, $F_1{}^2$ and $F_1{}^4$, the same circuit structure can be employed so that these filterings can be accomplished by means of time-sharing operation of a filter insofar as it functions quickly enough. Thereby, it is only necessary to provide double the number of time slots for the filtering $F_1{}^2$ as for the filter $F_1$, and to provide the four-times as many time slots for the filter $F_1{}^4$.

The pattern itself is arranged in such manner that the lower sideband is always selected, i.e., allowed to pass, in the lowest frequency range, i.e., in the frequency range from 4 kHz through 8 kHz. Accordingly, the filter $F_o$ need not be arithmetically symmetrical. As explained in Section 2.2(d) above, arithmetical-symmetrical filters require only half the number of adders and multipliers. However, when the filter demands are not symmetrical, an arithmetic-symmetrical filter which meets such demands is generally of a higher degree and, accordingly, requires more delay units. Since a time-sharing operation is not possible for these, the total costs can then be greater despite the savings in the arithmetic units.

Figure 4:
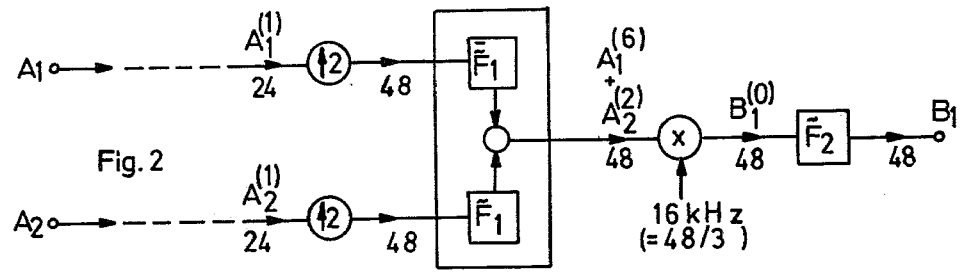
FIG. 4 shows the generation of, for example, $B_1$ by means of a directional filter which realizes the transfer function of the complementary filters $\tilde{F}_1$ and $\bar{F}_1$.
Figure 4:
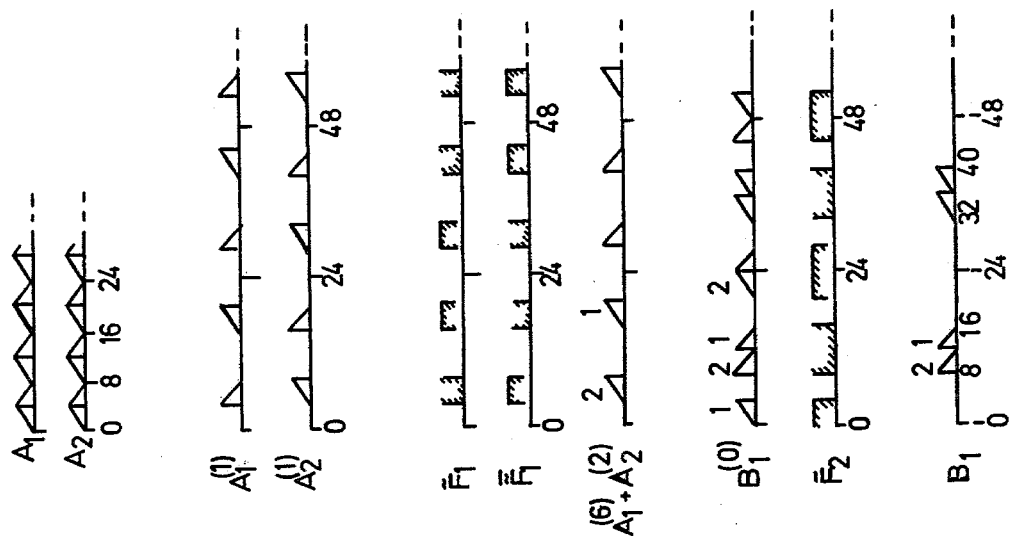

As seen from FIGS. 2 and 4, the pass bands and stop bands for the filters $F_1$ and $\widetilde{F}_1$ are identical. This, however, does not mean that the corresponding filter requirements are likewise identical. In fact, the stop attenuation of $F_1$ is equal to the return loss of $\widetilde{F}_1$, and vice versa. In praxis, return loss demands are always significantly lower than overall transmission loss demands (forward loss). Therefore, the filter degree that meets the requirements for $\widetilde{F}_1$ is significantly higher than that for $F_1$. Particularly if wave digital filters are employed, the assumption that the directional filters for the realization of $F_1$ and $\widetilde{F}_1$ require only half of the circuit structures as for the realization of the filter $F_1$ in FIG. 2 would not be correct. Nonetheless, a saving can certainly be achieved, because a filter such as, for example $\widetilde{F}_2$ which is illustrated in FIGS. 3 and 4 replaces the two filters $F_2$ in the circuit of FIG. 2. The filter requirements are arithmetic-symmetrical with respect to one-fourth of the operating rate. Accordingly, the filter $\widetilde{F}_2$ can be realized with a considerable saving with respect to the number of the adders and multipliers similar to that discussed above in Section 2.3(d). On the other hand, $\widetilde{F}_2$ is a band pass filter whereas $F_2$ is a low-pass filter, and the transition regions of $\widetilde{F}_2$ are only half as wide.

Figure 16:
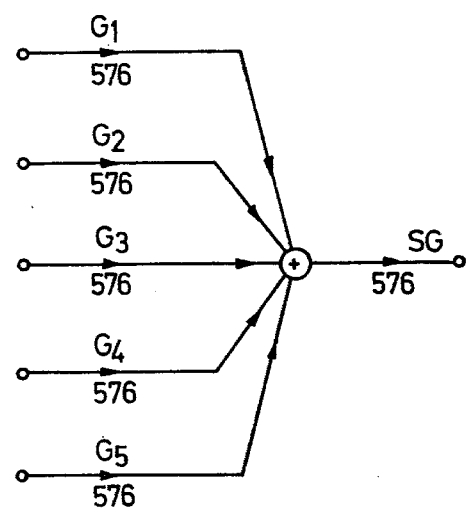
FIG. 16 shows an interconnection of the 12-channel groups $G_1$ through $G_5$ to form the basic super group SG (312–552 kHz)
Figure 16:
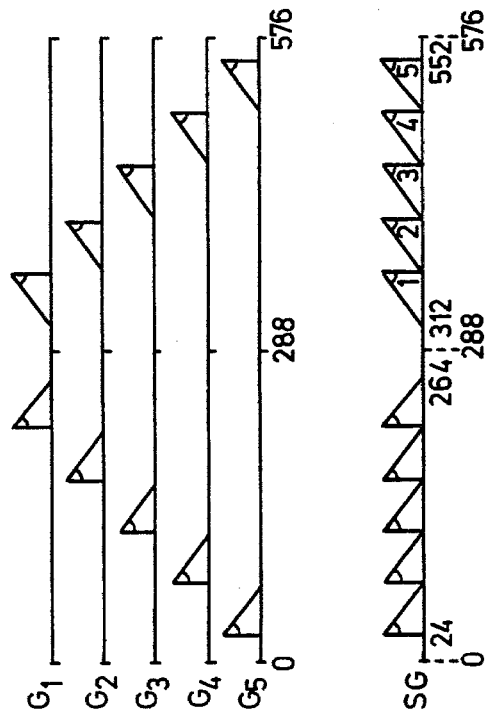
Figure 17:
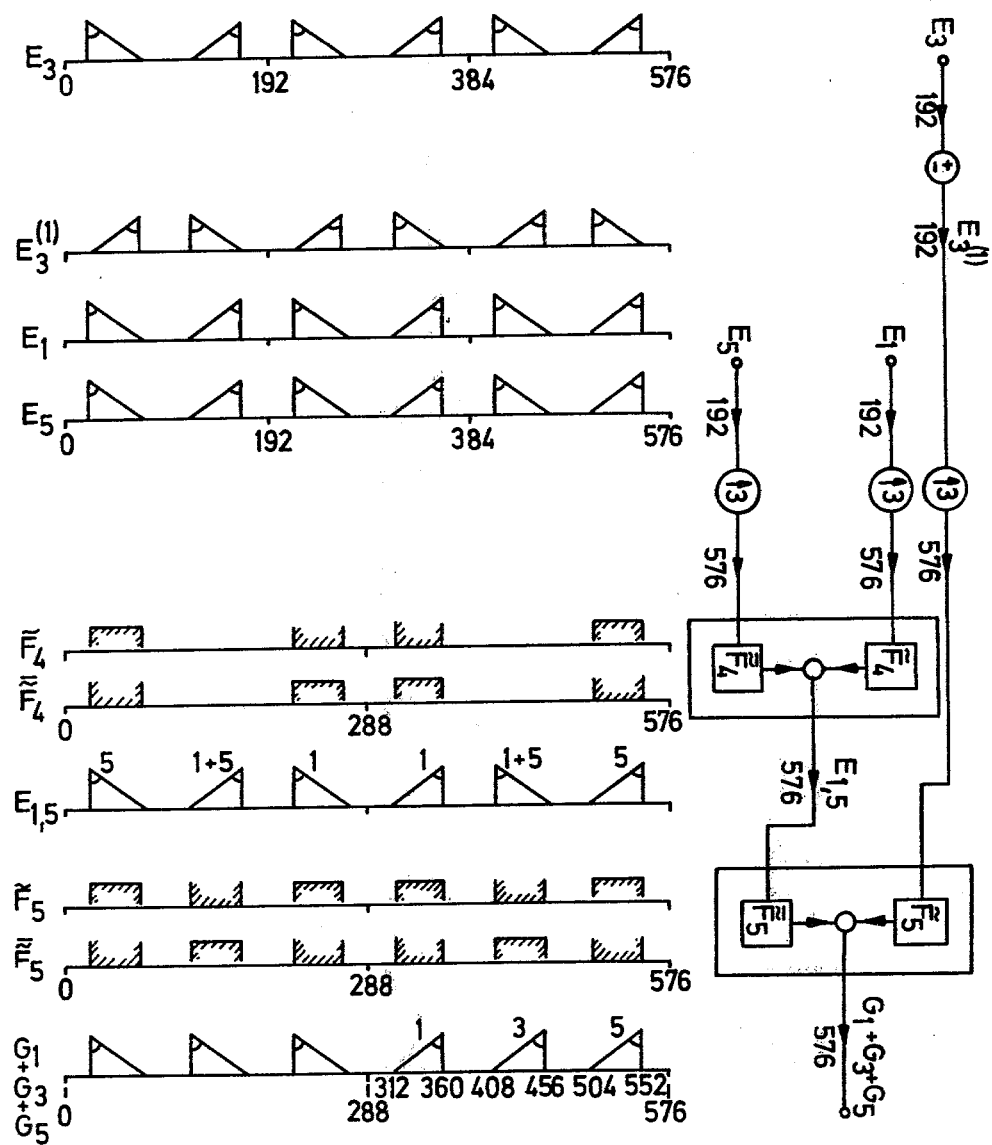
FIG. 17 shows the generation of $G_1+G_3+G_5$, using directional filters which realize the transfer functions of the complementary filters $\tilde{F}_4$ and $\bar{F}_4$ or, respectively, $\tilde{F}_5$ and $\bar{F}_5$.
Figure 18:
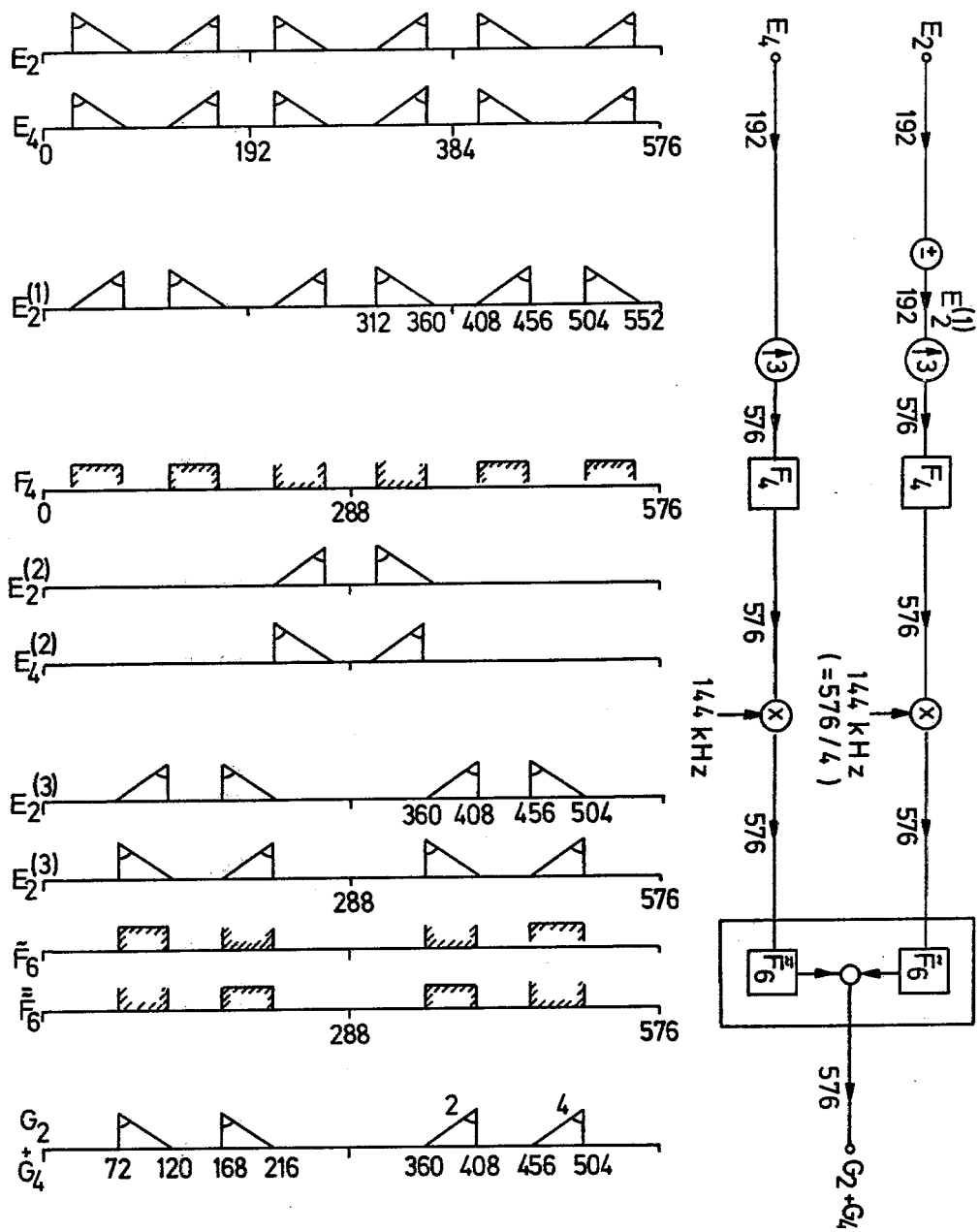
FIG. 18 shows the generation of $G_2+G_4$ by means of a directional filter which realizes the transfer functions of the complementary filters $\tilde{F}_6$ and $\bar{F}_6$.

FIG. 16 shows how the five groups $G_1$ through $G_5$ are to be combined in order to obtain the basic super group SG. This pattern can be correspondingly varied if the arrangements according to FIGS. 17 and 18 are employed for generating $G_1$ through $G_5$.

3.3 12-Channel System

A first method for generating a 12-channel system is to be seen in the employment of the pattern discussed in Section 3.2, limited, however, to the generation of $E_1$. In this case, one arrives at a relatively high operating rate, namely at a sampling frequency of 192 kHz.

Figure 19:
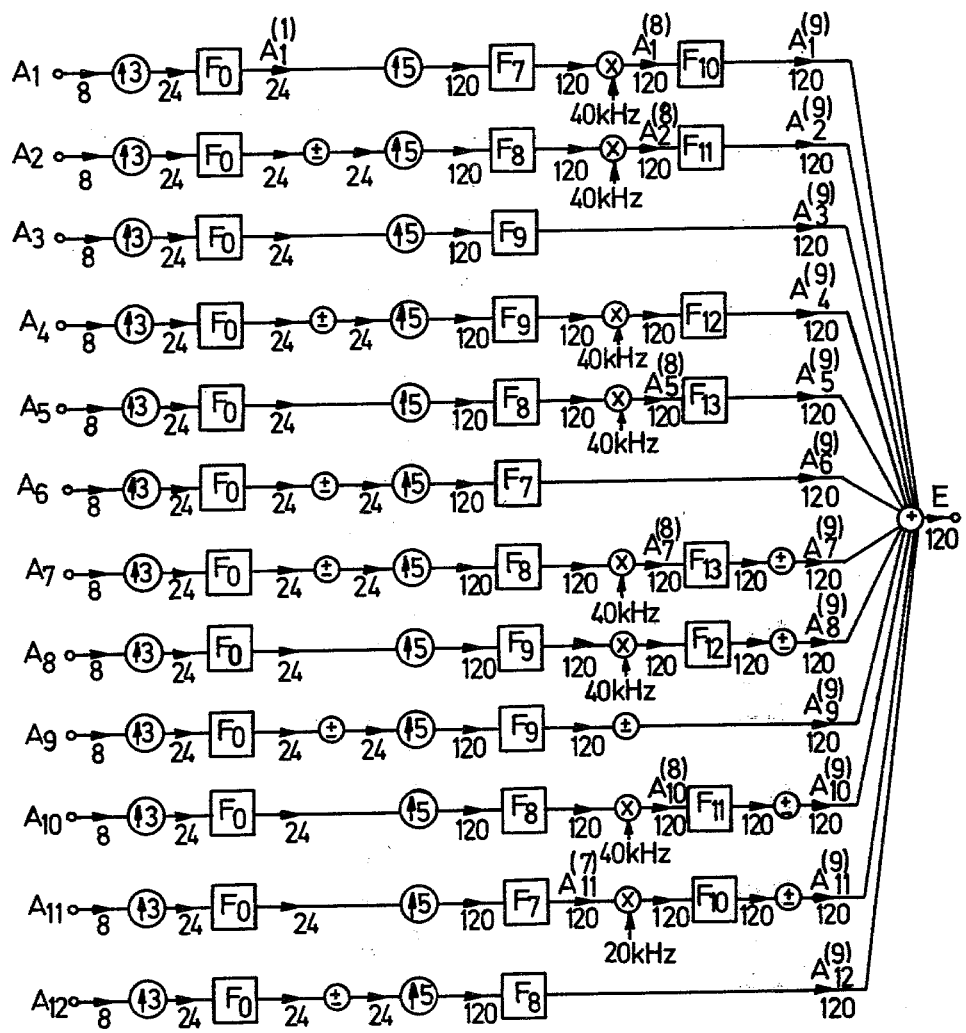
FIG. 19 is a block diagram of apparatus for generating a 12-channel group E.
Figure 20:
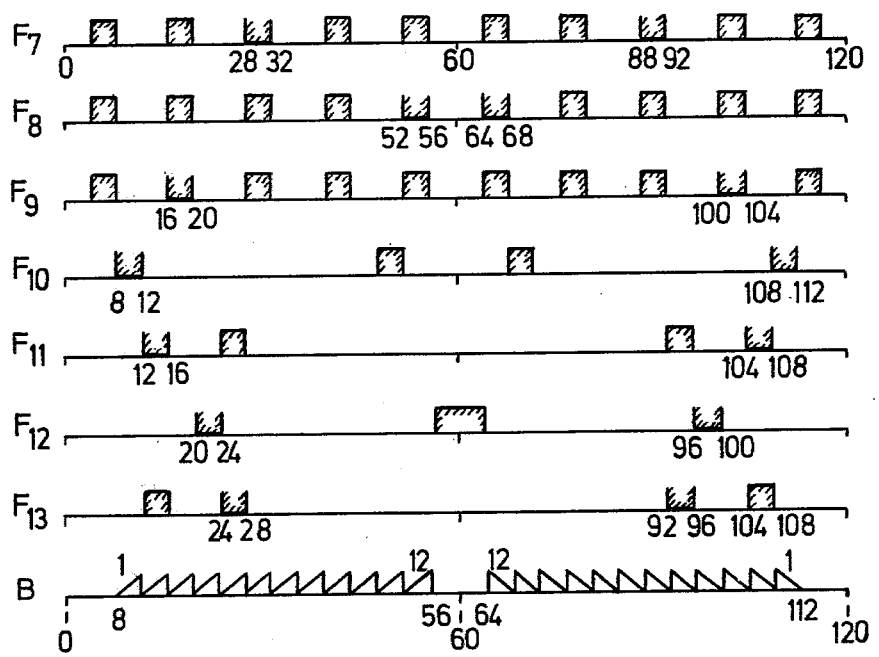
FIG. 20 shows the frequency ranges for the pass-through and attenuation bands which are specified for the filters $F_7$ through $F_{13}$ and the spectral distribution of the 12-channel group E.

If, however, one adopts an original sampling rate of 24 kHz, then it is possible, as discussed above, to generate the 12-channel group with the lowest possible final sampling rate of 120 kHz and, at the same time, also to observe the requirement that the modulators need only carry out multiplications with the values $+1$, $-1$ and 0. This has already been explained above for the example of a 60-channel system. Thus, FIG. 19 illustrates the block diagram of one embodiment. The filter $F_o$ is the same as in FIG. 2. In FIG. 20, on the one hand, the frequency ranges are specified for which the pass band and stop band requirements must be set down for the filters $F_7$ through $F_{13}$ and, the spectral distribution for the final 12-channel group E is also illustrated.

Figure 21:
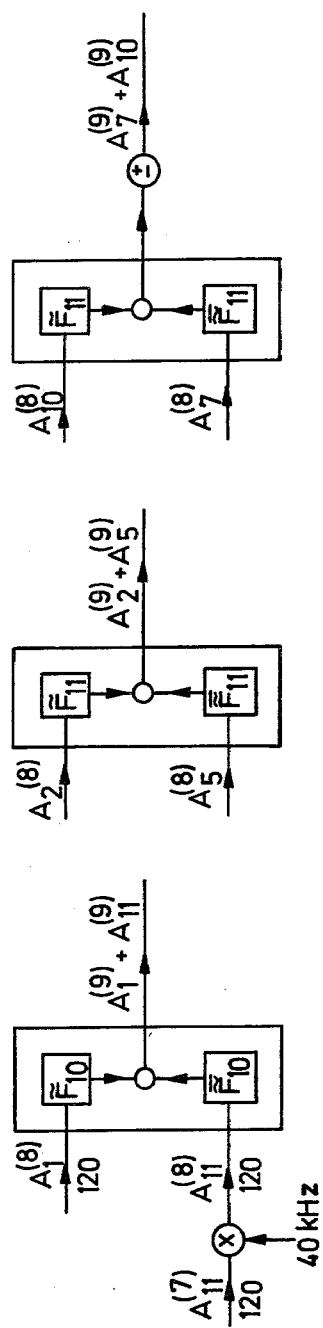
FIG. 21 shows a few possible modifications for the pattern illustrated in FIG. 19.

A series of alternative arrangements can also be specified for the pattern of FIG. 19 using directional filters. Appropriate modifications which must thereby be applied to the circuit of FIG. 19 are illustrated in FIG. 21; accordingly, the filters $\widetilde{F}_{10}$ and $\widetilde{F}_{11}$ have the same pass bands and stop bands as the filters $F_{10}$ and $F_{11}$. The signals $A_1{}^{(9)}+A_{11}{}^{(9)}$, $A_2{}^{(9)}+A_5{}^{(9)}$ and $A_7{}^{(9)}+A_{10}{}^{(9)}$ can thus be generated by means of the employment of wave digital directional filters, whereas the signals $A_3{}^{(9)}$, $A_4{}^{(9)}$, $A_6{}^{(9)}$, $A_8{}^{(9)}$, $A_9{}^{(9)}$ and $A_{12}{}^{(9)}$ can be generated in the same manner as previously. All of these signals must then again be added in order to form the group E.

3.4 Outband signaling and Pilot Frequencies

If a FDM system is to be provided with outband signaling, a signal tone of 3850 Hz (or, respectively 3825 Hz) must be introduced in a suitable manner, as is known. For the patterns described in Sections 3.2 and 3.3 above, this requires the introduction of a tone of 4150 Hz (or 4175 Hz) directly after the filter $F_o$. Therefore, this filter should have an attenuation peak in the neighborhood of this frequency; this is to be required in the case of PCM/FDM conversion, but even in case of audio/FDM conversion, it would not be reasonable to provide a corresponding attenuation peak at the analog filter which precedes the input scanning.

If the band pass filter with the lowest pass band (4 through 8 kHz) is a wave digital filter, simplifications can again be achieved by using it as a directional filter. If, thus, the filter $F_o$ is modified to form filter $\widetilde{F}_o$ in such manner that $\widetilde{F}_o$ also has the aforementioned attenuation peak, its complementary input terminal is suited to insert the signaling tone, since a certain filter effect is then automatically given. The appropriate arrangement is illustrated for channel $A_1$ in FIG. 22a.

Another embodiment, better than the one just described, consists of the introduction of an additional signal filter $F_S$ directly after the filter $F_o$. If the filter $F_S$ is a wave digital filter as is illustrated in FIG. 22b, it can again be employed as a directional filter which has band pass filter behavior for the signaling path, and the band stop behavior complementary thereto for the main transmission path. In this case, a precisely limited signal channel can be realized in a simple manner.

The explanations given above in Section 2.1 to the effect that the same arrangements could be employed for the transmission and reception directions are also valid for the signaling circuits just discussed. Finally, the arrangement just discussed can also be employed for coupling pilot signals in and out.

The modules employed in the block diagrams of the figures, such as filters, modulators, arrangements for increasing the sampling rate, summing circuits ($+$) and operational sign inverters ($\pm$), are known per se. The known wave filters are particularly suited as digital filters since, because of their configuration and their circuit design, they can be directly derived from equivalent LC-circuits and, thus, also completely have the properties of LC-circuits, particularly of equivalent LC-branching circuits. They also have the properties of directional filters. The construction and operation of such filters are known, for example, from the German Letters Patent Nos. 2,027,303 and 2,263,087. Further, other filter circuits, such as filter modules having switched capacitors are likewise suited to process sampled signals. Such filters are described in the book published by G. Biorci, "Network and Switching Theory", and are also described there in the section "Resonant Transfer Circuits" (pages 382–446) (Academic Press, New York, 1968).

The embodiments illustrated in the drawings, particularly with respect to their numerical specifications, are especially useful for systems in which the original audio signal has a band width of approximately 4 kHz. If the circuits are to be employed in systems for which a different channel width is provided, then the numbers with respect to the basic work rate must be changed in accord with the specified multiplication factors.

The filter $F_o$ in the illustrated embodiments represents the actual channel filter and, thus, that filter for which the most stringent requirements exist in all transmission systems. It is precisely for this filter, however, that the digital realization is provided in such manner that it functions at the smallest possible operating rate in the system, whereby the cost and complexity can be kept at a minimum, which is also of significance for an integrated manufacture of such filters.

Filters processing sampled signals, such as, for example, digital filters in general have a filter characteristic which is mirror-symmetrical to the frequency F/2 and is periodic with the frequency F, if F is the operating rate. Therefore, further, undesired, pass bands can arise. For this reason, the filters post-connected to the filter $F_o$ in the individual transmission paths are laid out in such manner that their stop bands cover the disruptive pass bands of the filter $F_o$ and, therefore, the operating rates are respectively increased step-by-step in such manner that this requirement can be met. By so doing, the plurality of the respective voice channels to be selected in common is correspondingly increased at the same time.

Further, the standard sampling rate of 8 kHz usual in present PCM systems is assumed in the illustrated embodiments. In this respect, too, the numerical values and the factors assigned to them must be changed if PCM systems with other standard sampling rates should be employed. The methods and circuits specified here also make it possible at any time to change over directly from the frequency ranges provided for carrier-frequency transmission systems to PCM systems, and vice versa, without having to reduce the individual channels from the carrier-frequency transmission range into the audio range and without having to again reconstruct them in the PCM system for the transmission of a larger plurality of individual channels. Circuits with this characteristic are also designated as transmultiplexers.

FIG. 2 shows in detail how, by way of example, two channels $A_1$ and $A_2$, such as those of FIG. 1, can be combined. Proceeding from an operating rate of 8 kHz, the operating rate for the two channels is increased by the factor 3 to 24 kHz. The filter $F_o$ subsequently follows for each channel, the operational sign is inverted for channel $A_2$ for each second sample, and, subsequently, the operating rate is increased for both channels by the factor 2 to 48 kHz. The filters $F_1$ are connected thereto, which filters are followed by the modulators with 16 kHz (=48/3) modulation frequency. The filters $F_2$ are connected subsequent thereto and, before the combination of the channels in the addition circuit "+" to form the 2-channel sub-group $B_1$, the operational sign of each second scanning sample for channel $A_1$ is inverted ($\pm$).

The pass band of filter $F_o$ lies between 4 kHz and 8 kHz; the filters $F_1$ and $F_2$ are dimensioned in such manner that, on the one hand, the disruptive pass band ranges of the filter $F_o$ are covered by means of the stop attenuation of filters $F_1$ and $F_2$ and, at the same time, care is also taken with respect to the operational sign inversion that the channels $A_1^{(1)}$, $A_2^{(1)}$ arrives in the proper position upon combination to form channel $B_1$, i.e., between 8 kHz and 16 kHz in inverted position and between 32 kHz and 40 kHz in normal position.

The circuit of FIG. 3 is operationally identical to that of FIG. 2. There, however, the modulation with 16 kHz is only undertaken after the combination and the filter $\tilde{F}_2$ is post-connected. This is also true of the circuit for 48 kHz which provides the directional filter consisting of the filters $\tilde{F}_1$ and $\tilde{\tilde{F}}_1$, the modulator being connected to the output of this directional filter.

Figure 5:
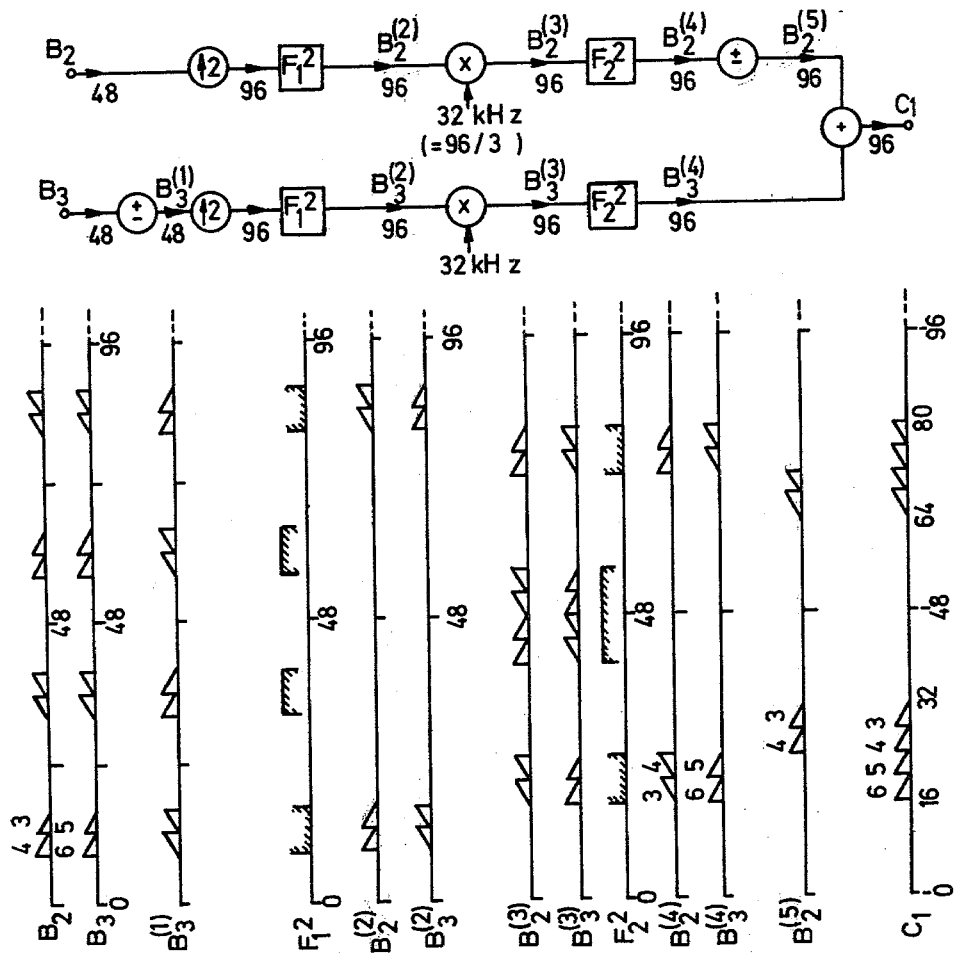
FIG. 5 shows a modulation arrangement for generating a four-channel sub-group $C_1$ or, respectively, $C_2$ according to FIG. 1.
Figure 5A:
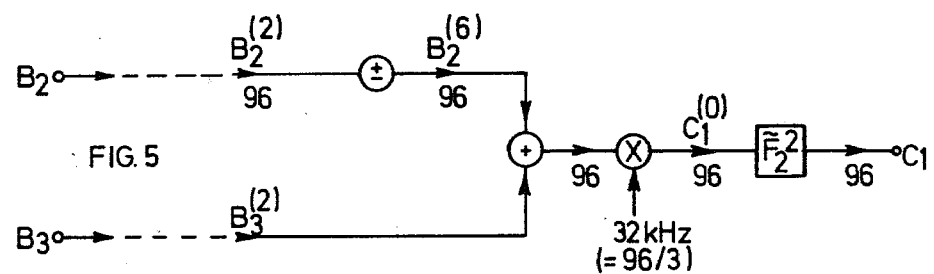
FIG. 5a shows a further arrangement for generating $C_1$ or, respectively, $C_2$.
Figure 5A:
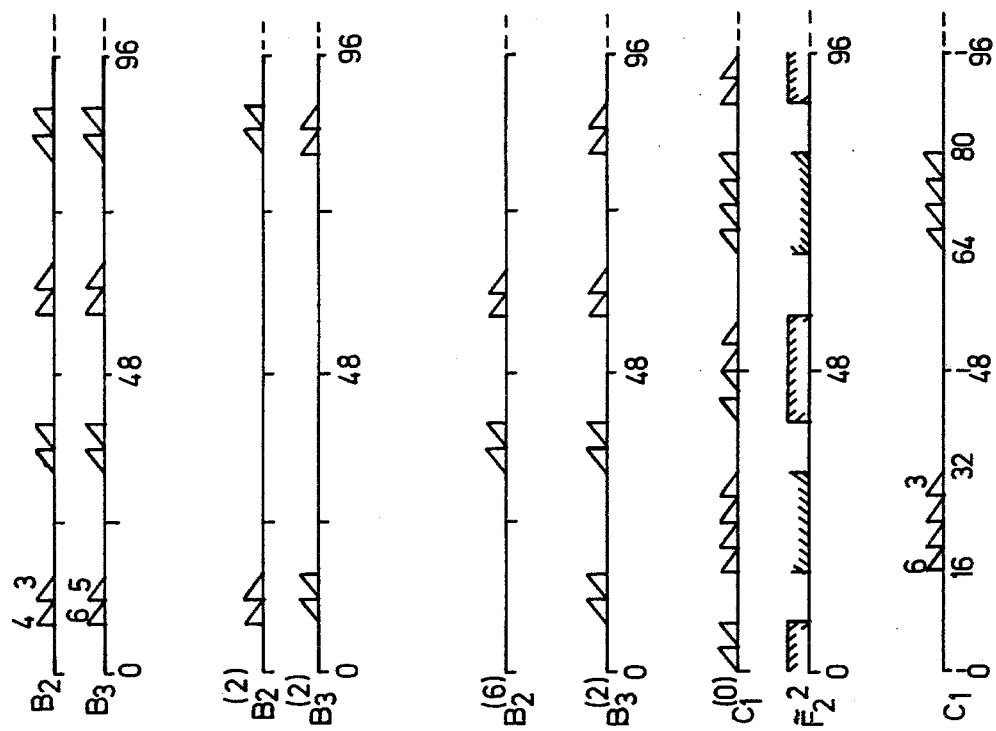
Figure 6:
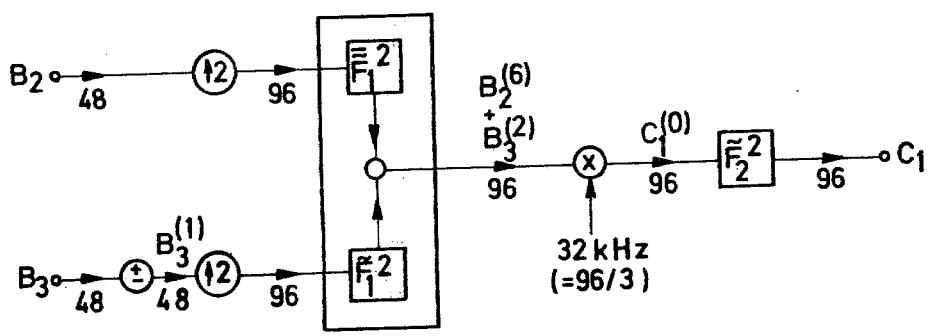
FIG. 6 shows the generation of $C_1$ by employing a directional filter which realizes the transfer functions of the complementary filters $\tilde{F}_1^2$ and $\bar{F}_1^2$.
Figure 6:
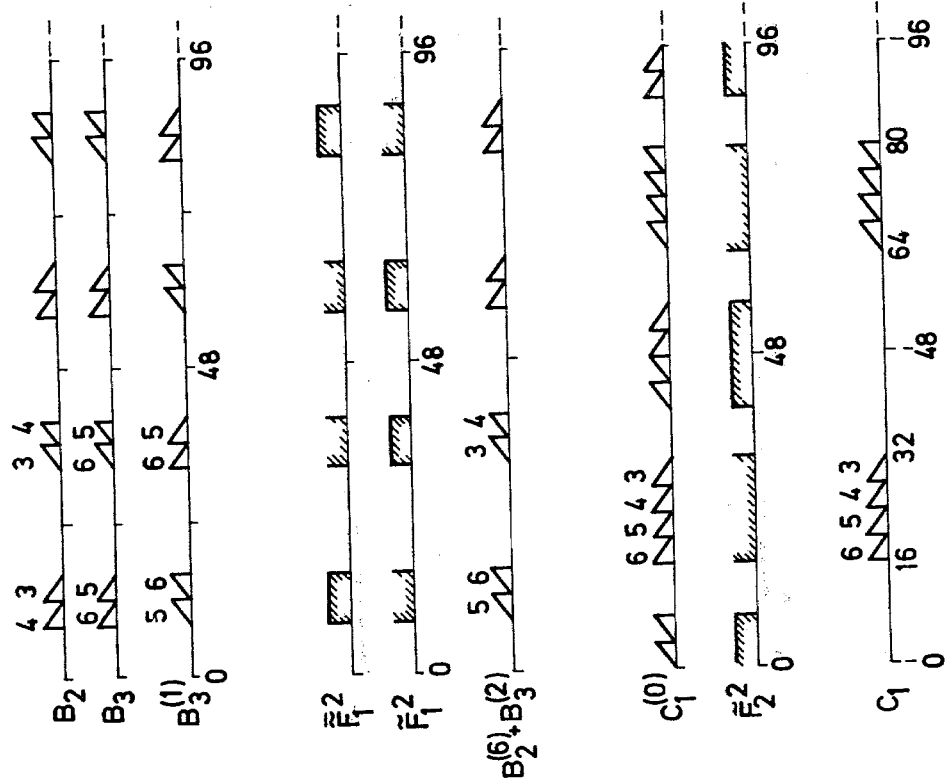

FIGS. 5, 5a and 6 illustrate circuits for generating 4-channel sub-groups from two 2-channel sub-groups. As an example, the two 2-channel sub-groups $B_2$ and $B_3$ (FIG. 1) are selected which are combined in the addition circuit (+) to form the 4-channel sub-group $C_1$. For both channels, the work rate is first increased by the factor 2 from 48 kHz to 96 kHz, so that the filters $F_1^2$ are connected thereto in accord with the earlier embodiments. In channel $B_3$, an operational sign inversion ($\pm$) already occurs at the input. A modulator with 32 kHz (=96/3) modulation frequency is respectively post-connected to the filters $F_1^2$. There then follows the filters $F_2^2$ and an operational sign inversion for the channel $B_2$.

Corresponding to the spectral and frequency plans, the channels 4, 3 of the 2-channel sub-group $B_2$ and the channels 6, 5 of the 2-channel sub-group $B_3$ lie in the 4-channel sub-group $C_1$ in inverted position, between the frequencies 16 kHz and 32 kHz, or, respectively, mirror-symmetrically to the frequency 48 kHz in normal position, between the frequency 64 kHz and 80 kHz. In FIG. 5a, the reference to the preceding circuit can be directly seen "in FIG. 5". The combination of $B_2$ and $B_3$ ensues after the operational sign inversion for $B_2$ has been carried out. After the combination, the modulation with 32 kHz ensues, so that here too, (as in FIG.3), only one modulator is required. The filter $\tilde{F}_2^2$ is post-connected to the modulator, at the output of which the 4-channel sub-group $C_1$ again appears at the operating rate of 96 kHz. In the sample embodiment of FIG. 6, the operational sign inversion ($\pm$) is first carried out for the 2-channel sub-group $B_3$, the operating rate for both channels $B_2$ and $B_3$ is subsequently increased by the factor 2 to 96 kHz and the channels are combined in a directional filter with transfer functions $\tilde{F}_1^2$ and $\tilde{\tilde{F}}_1^2$, which are complementary to one another. The same circuit as in FIG. 5a lies at the output of this directional filter.

Figure 7:
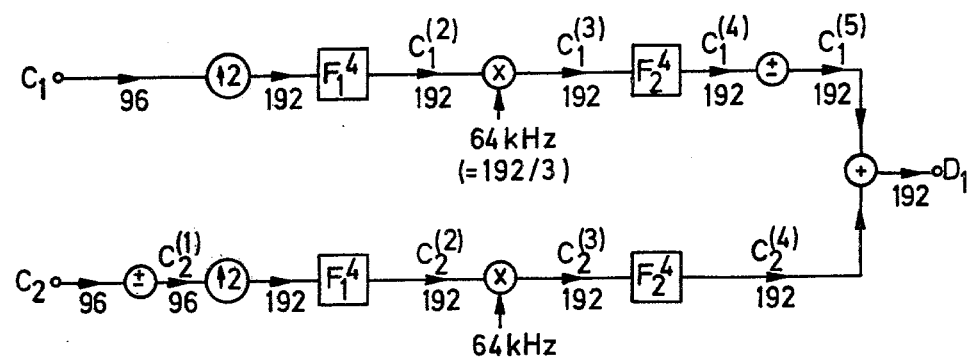
FIG. 7 shows a modulation arrangement for generating an 8-channel sub-group $D_1$ according to FIG. 1.
Figure 7:
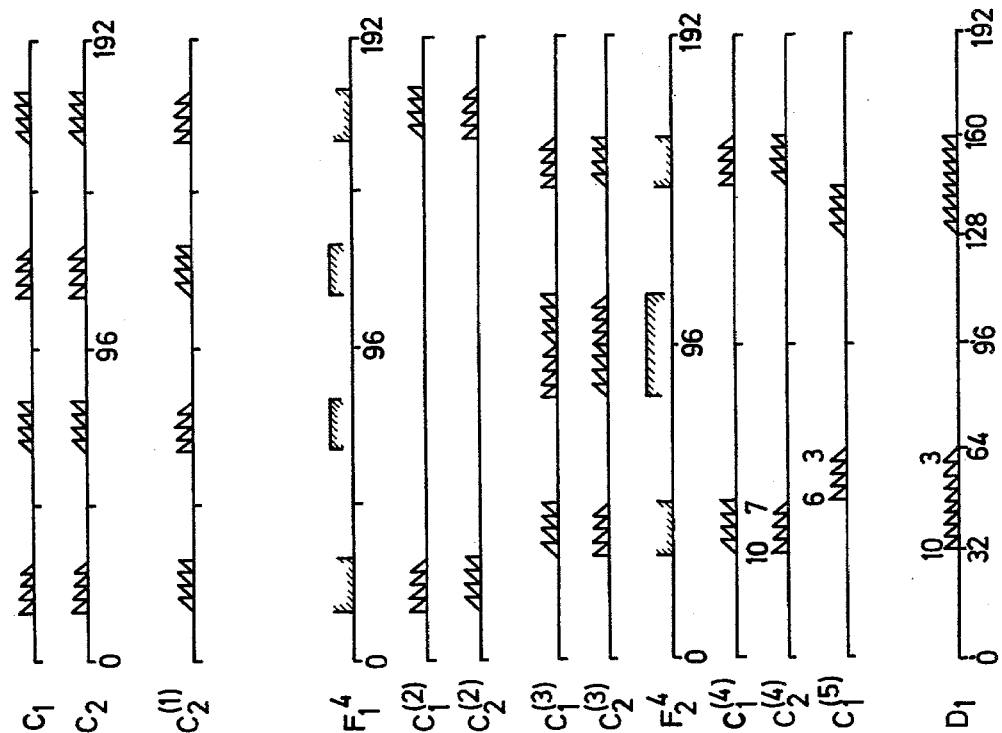
Figure 7A:
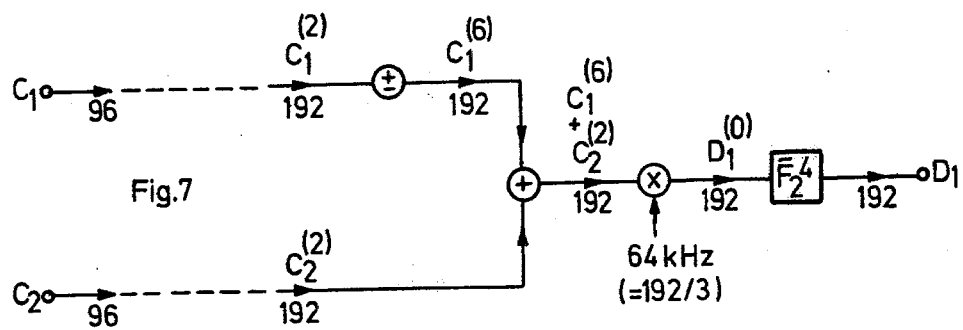
FIG. 7a shows a further arrangement for generating $D_1$.
Figure 7A:
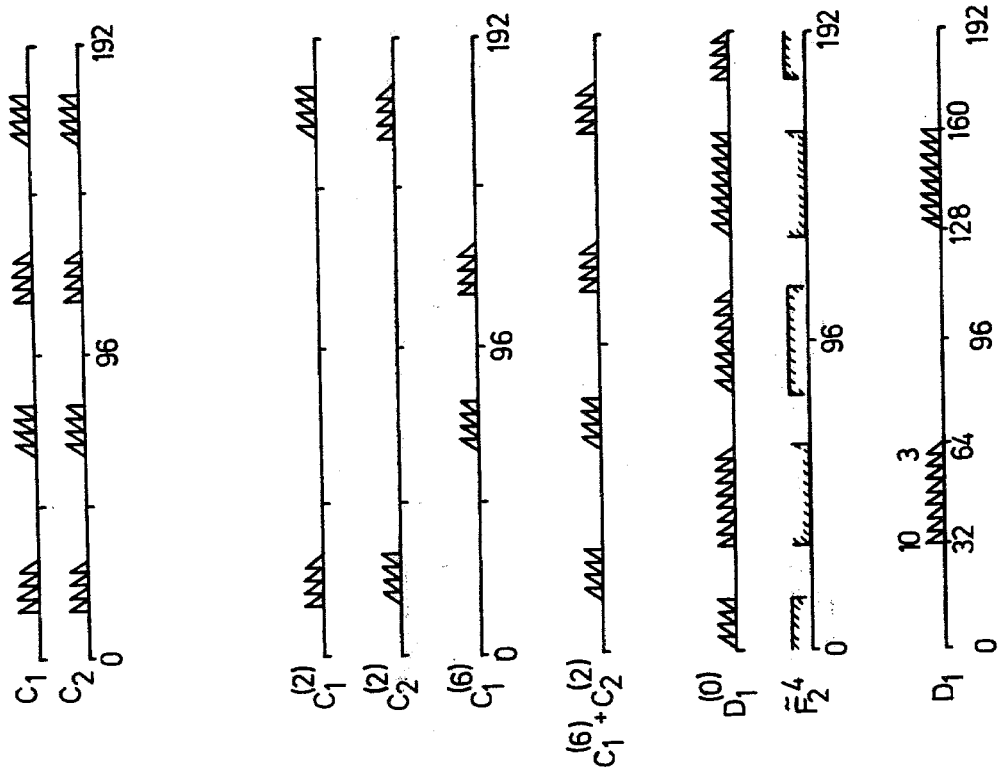
Figure 8:
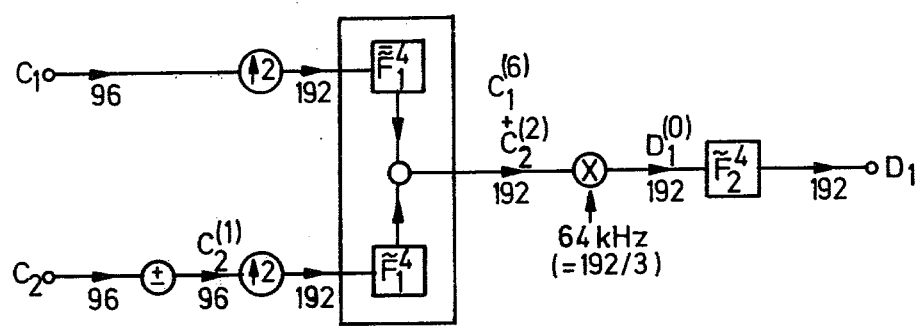
FIG. 8 shows the generation of $D_1$ by means of a directional filter which realizes the transfer functions of the complementary filters $\tilde{F}_1^4$ and $\bar{F}_1^4$.
Figure 8:
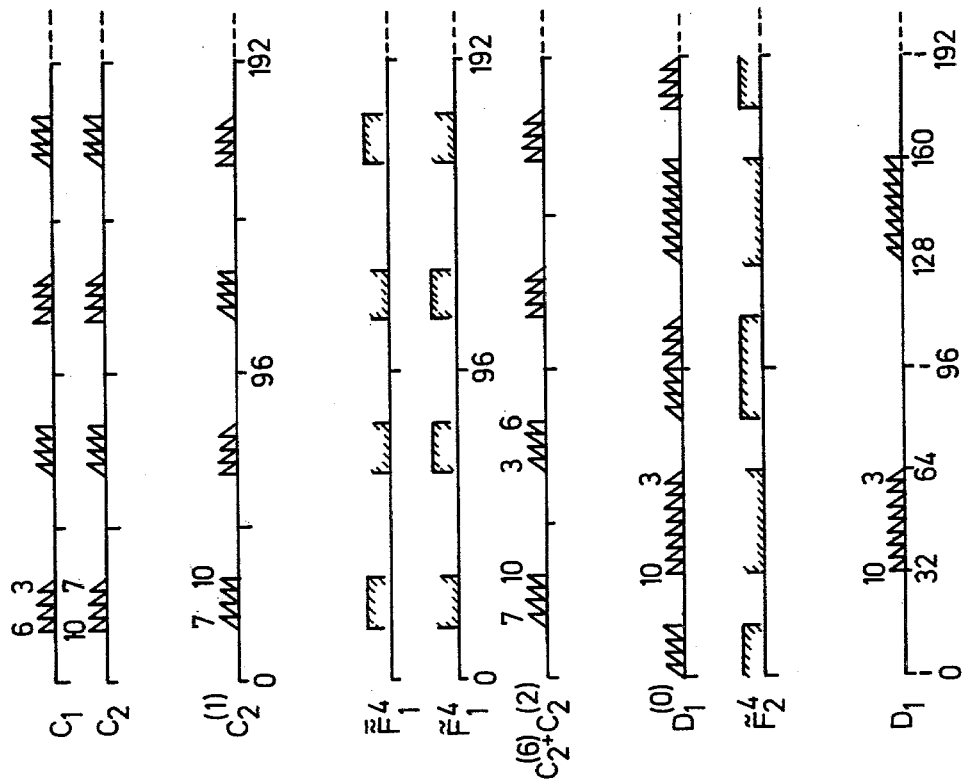

FIGS. 7, 7a and 8 illustrate sample embodiments for generating the 8-channel sub-groups $D_1$ which appear at an operating rate of 192 kHz after being combined in the summer (+). In FIG. 7, the operational sign inversion is first carried out for $C_2$, the operating rate is subsequently increased by the factor 2 to 192 kHz so that, accordingly, the filters $F_1^4$ follow in both channels.

There subsequently follows a modulation with the modulation frequency 64 kHz (=192/3), to which the filters $F_2^4$ are post-connected to both channels. An operational sign inversion also ensues for the 4-channel sub-group $C_1$ before the combination. The channels 10 through 3 for the 8-channel sub-group $D_1$ thus appear mirror-symmetrically to the frequency 96 kHz in inverted position between the frequencies 32 kHz and 64 kHz, and in normal position between the frequencies 128 kHz and 160 kHz. This is also true of the circuit according to FIG. 7a, in which the operational sign inversion for channel $C_1$ ensues immediately before combination and, subsequently, $C_1$ and $C_2$ are supplied in common to the modulator with the modulation frequency 64 kHz. The filter $\tilde{F}_2^4$ is post-connected to the modulator. FIG. 8 reveals a circuit in which a directional filter with the transfer functions $\tilde{F}_1^4$ and $\tilde{F}_1^4$, complementary to one another, is employed for the combination, at the output of which directional filter there lies the same circuit as in FIG. 7a. Thereby, for channel $C_2$, the operational sign inversion is carried out first, and, after increase of the operating rate by the factor 2 to 192 kHz, $C_1$ is supplied to the filter $F_1^4$ and $C_2$ is supplied to the filter $\tilde{F}_1^4$.

Figure 9:
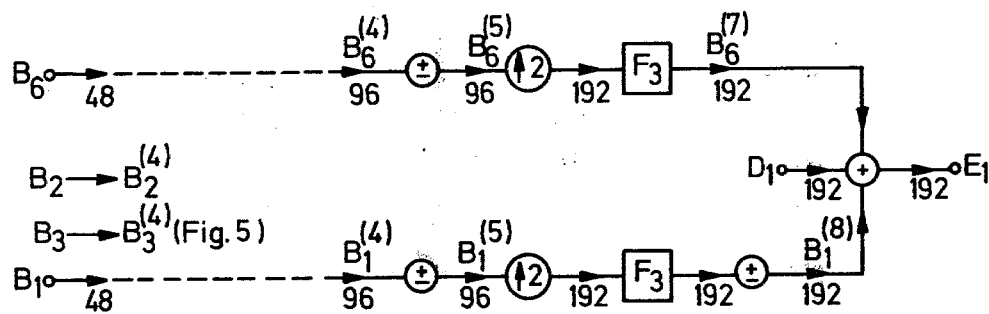
FIG. 9 shows a modulation arrangement for generating a 12-channel group $E_1$ and, correspondingly, $E_2$ through $E_5$, according to FIG. 1.
Figure 9:
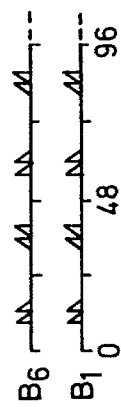
Figure 9:
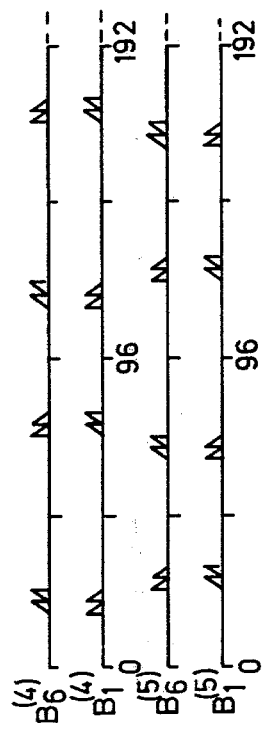
Figure 9:
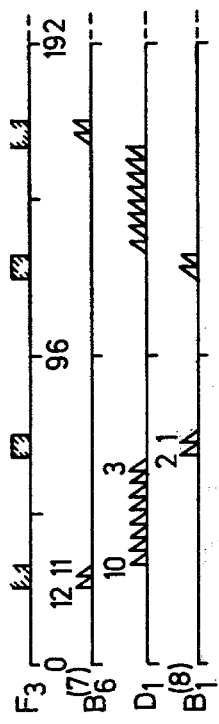
Figure 9:
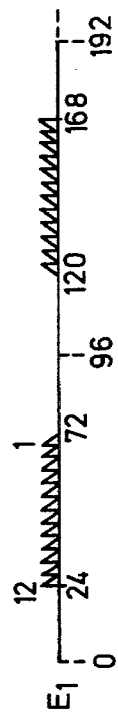
Figure 10:
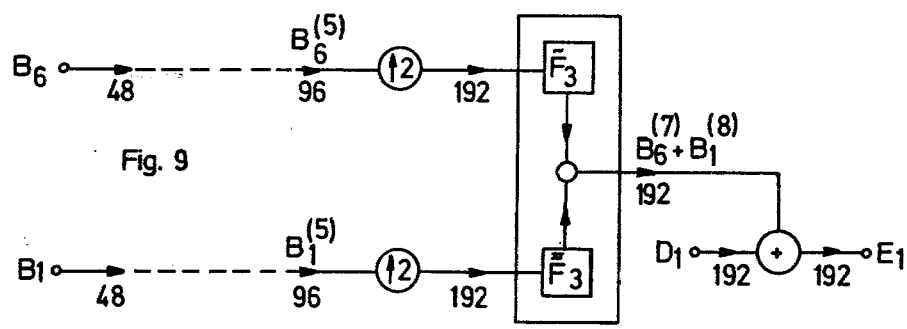
FIG. 10 shows the generation of $E_1$ by means of a directional filter which realizes the transfer functions of the complementary filters $\tilde{F}_3$ and $\bar{F}_3$.
Figure 10:
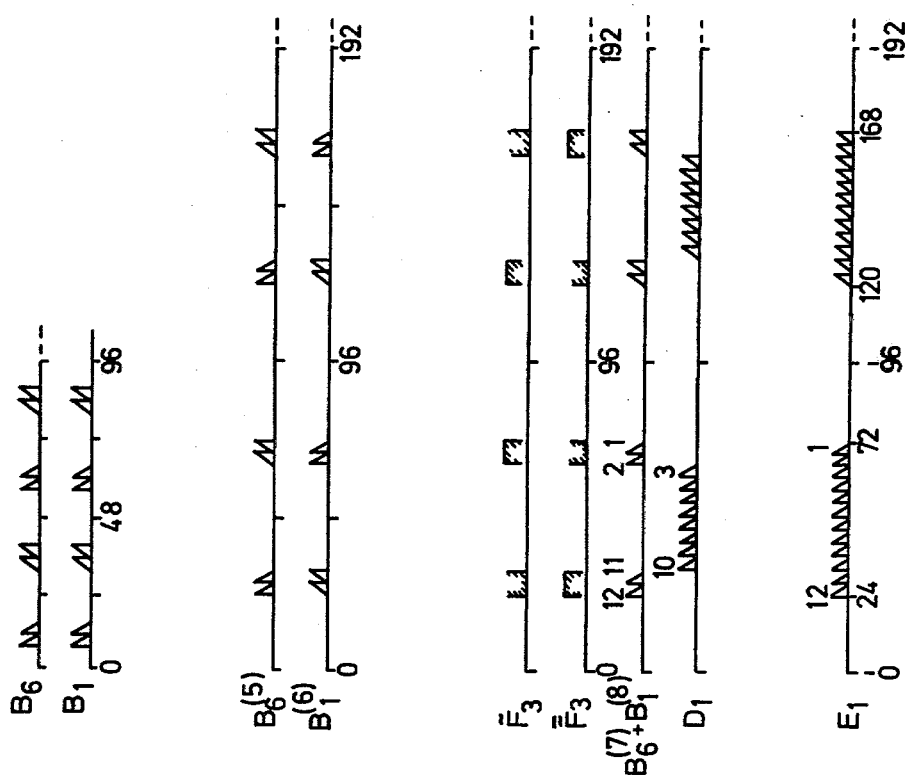

It is possible to combine the outer 2-channel sub-groups $B_1$ and $B_6$ (FIG. 1) with the circuits according to FIGS. 9 and 10. The broken lines in FIG. 9 indicate that the same circuits are employed there as in FIG. 5 between the circuit points $B_2$ and $B_2^{(4)}$ or, respectively, the circuit points $B_3$ and $B_3^{(4)}$. Accordingly, these circuit points are indicated in FIG. 9 with $B_6^{(4)}$ and $B_1^{(4)}$. First, an operational sign inversion ($\pm$) is carried out for $B_1$ and $B_6$, subsequently the operating rate is increased by the factor 2 to 192 kHz and the filters $F_3$ then follow. The operational sign is inverted for the 2-channel sub-group $B_1$ before the combination (+). When the 8-channel sub-group $D_1$ is additionally introduced into the addition circuit (+), then the 12-channel group $E_1$ is provided at the output. The pass band and stop bands of the filter $F_3$ lie mirror-symmetrically to the frequency 96 kHz in such manner that $E_1$ appears between 24 kHz and 72 kHz in inverted position and between 120 kHz and 168 kHz in normal position. In the circuit of FIG. 10, the two filters $F_3$ are replaced by means of a directional filter with transfer functions $\tilde{F}_3$ and $\tilde{F}_3$, complementary to one another, so that the complete 12-channel group $E_1$ then appears at the output of the post-connected adder (+) when the 8-channel sub-group $D_1$ is supplied to the adder (+) at the same time.

Figure 11:
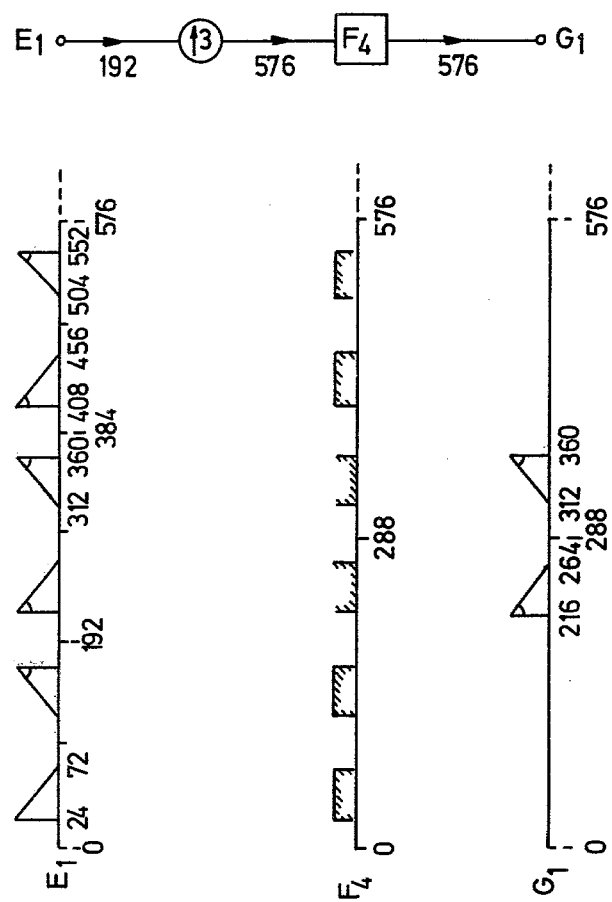
FIG. 11 shows a modulation arrangement for generating the 12-channel group referenced with $G_1$ in FIG. 1 given an operating rate of 576 kHz.
Figure 12:
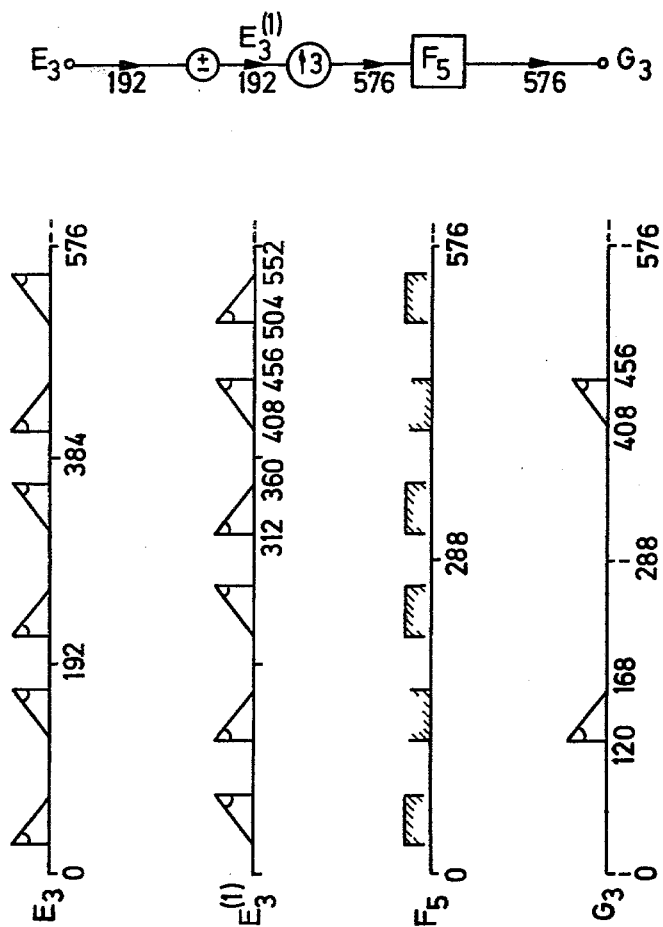
FIG. 12 shows a modulation arrangement of the 12-channel group referenced in FIG. 1 with $G_3$.
Figure 13:
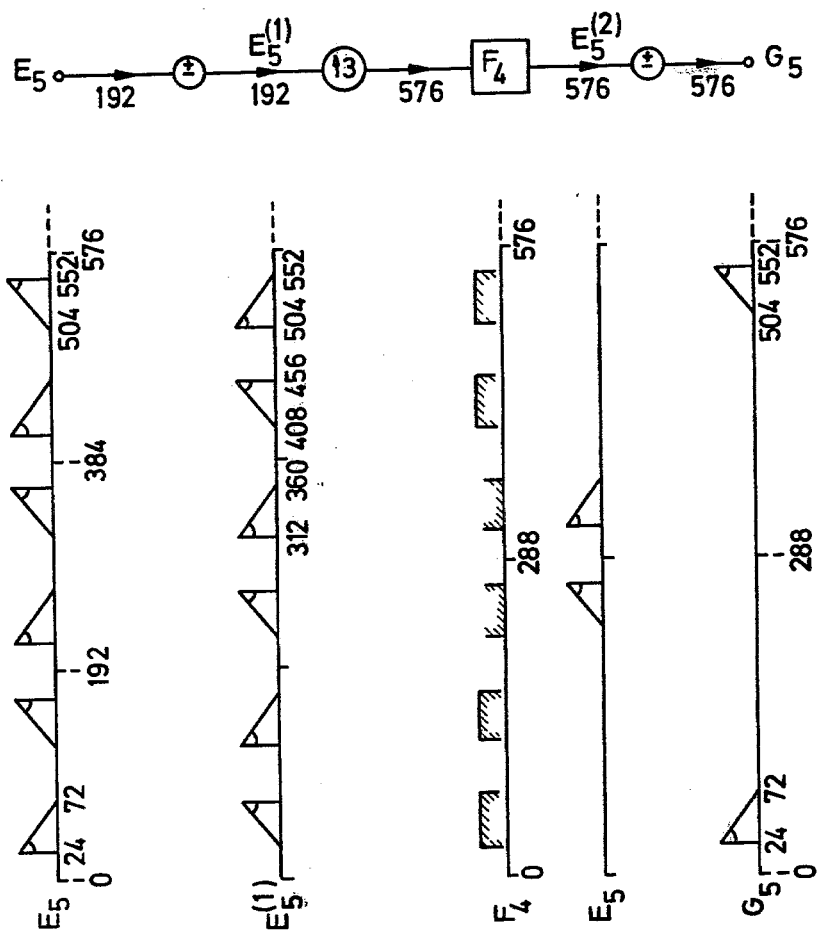
FIG. 13 shows a modulation arrangement for generating the 12-channel group referenced in FIG. 1 with $G_5$.

Modulation arrangements are illustrated in FIGS. 11 through 13, with which the 12-channel groups $E_1$ or, respectively, $E_3$ or, respectively, $E_5$ at 192 kHz operating rate can be converted into the 12-channel groups $G_1 G_3$, $G_5$ at the operating rate 576 kHz. To this end, in all three cases the operating rates are increased by the factor 3; in FIG. 11, directly before filter $F_4$ at whose output $G_1$ already appears. In FIG. 12, an operational sign inversion ($\pm$) at the input side and the filter $F_5$ is provided at the operating rate 576 kHz, so that $G_3$ appears at the output. In its central part, FIG. 13 contains the same circuit as FIG. 11, however, additional sign inversion operations ($\pm$) are provided at the input and output sides. The pass bands and stop bands of the filters $F_4$ and $F_5$ lie symmetrical to the frequency 288 kHz in such manner that $G_1$ lies between 312 kHz and 360 kHz or, respectively, in inverted position between 216 kHz and 264 kHz, that $G_3$ appears between 408 kHz and 456 kHz or, respectively, in inverted position between 120 kHz and 168 kHz, and, finally, $G_5$ appears between 504 kHz and 552 kHz or, respectively, in inverted position between 24 kHz and 72 kHz.

Figure 14:
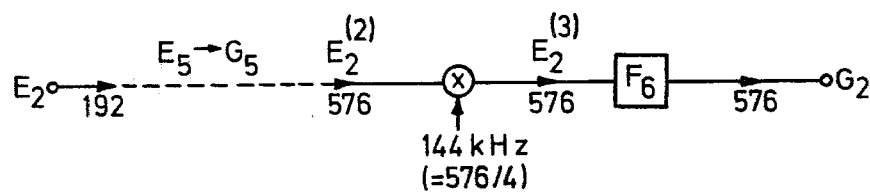
FIG. 14 shows a modulation arrangement for generating the 12-channel group referenced in FIG. 1 with $G_2$.
Figure 14:
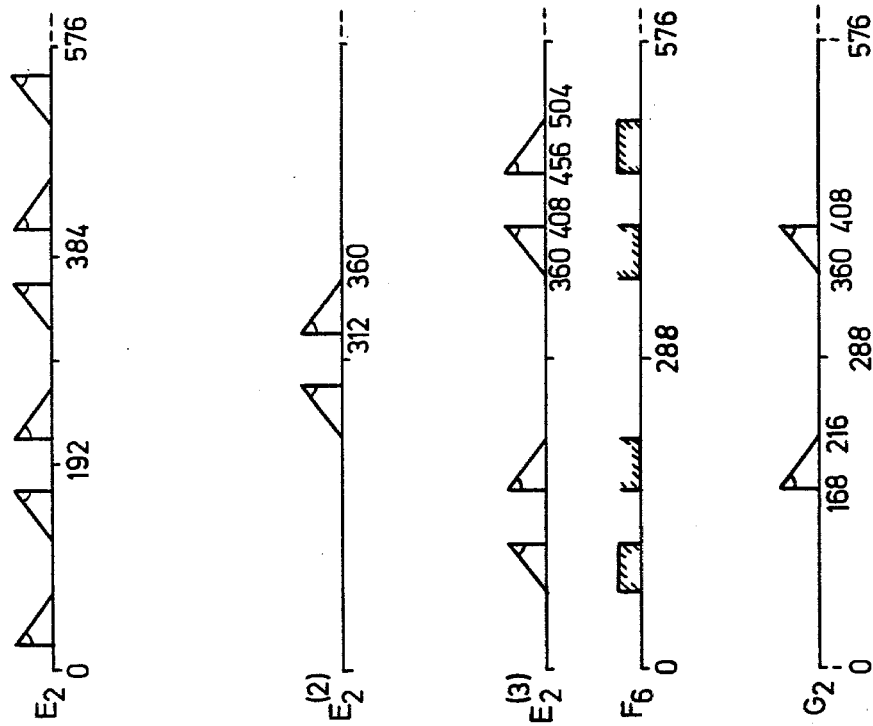
Figure 15:
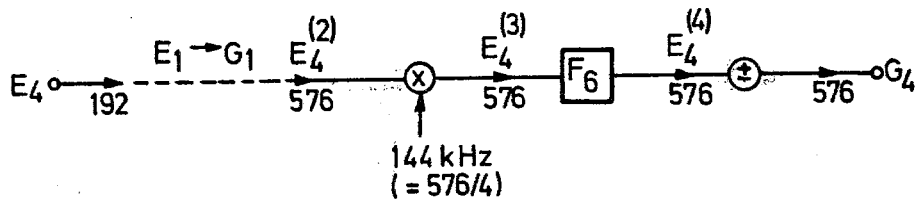
FIG. 15 shows a modulation arrangement for generating the 12-channel group referenced in FIG. 1 with $G_4$.
Figure 15:
Figure 15:
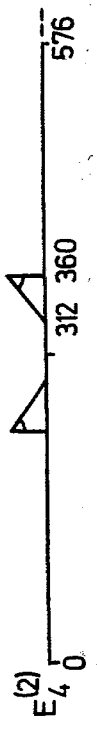
Figure 15:
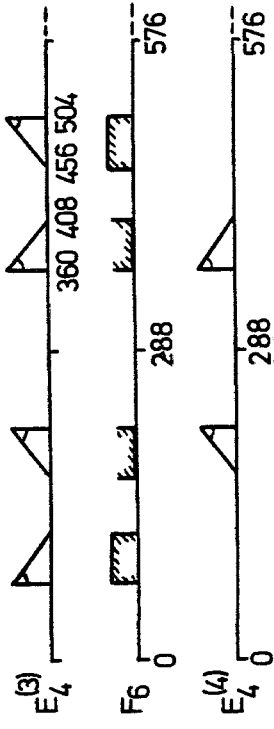
Figure 15:
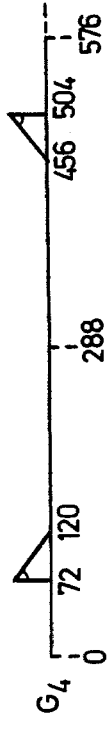
Figure 15:

In circuits according to FIGS. 14 and 15, the 12-channel groups $E_2$ or, respectively, $E_4$ are converted into the 12-channel groups $G_2$ or, respectively, $G_4$ for which the operating rate 576 kHz is likewise provided. To this end, the modulators (x) with the modulation frequency 144 kHz are employed, to which the filters $F_6$ are connected. The broken line in FIG. 14 indicates that the same circuit section is provided there as for the conversion of $E_5$ to $G_5$ (FIG. 13), whereas, the broken line in FIG. 15 indicates the same circuit section as for the conversion of $E_1$ to $G_1$ according to FIG. 11. In FIG. 15, a further inversion ($\pm$) of the operation sign is connected to the filter $F_6$. For the filter $F_6$, too, the filter characteristic lies mirror-symmetrical to the frequency 288 kHz, so that thus, the 12-channel group $G_2$ appears in normal position between the frequencies 360 kHz and 408 kHz, and in inverted position between the frequencies 168 kHz and 216 kHz, whereas the 12-channel group $G_4$ appears in normal position between the frequencies 456 kHz and 504 kHz and in inverted position between the frequencies 72 kHz and 120 kHz.

According to FIG. 16, thus, the basic super group SG arises when one combines the five 12-channel groups $G_1$ through $G_5$ in an adder circuit (+), so that the complete basic super group frequency position is achieved between 312 kHz and 552 kHz in the normal position, or, respectively, between 24 kHz and 264 kHz in the inverted position.

The employment of directional filters for generating the 12-channel groups $G_1$ through $G_5$ from the 12-channel groups $E_1$ through $E_5$ illustrated in FIGS. 17 and 18. In the circuit of FIG. 17, the operating rate is first increased by the factor 3 to 576 kHz for $E_1$ and $E_5$ and, subsequently, $E_1$ is supplied to the filter $\tilde{F}_4$, whereas $E_5$ is supplied to the filter $\tilde{F}_4$. The 12-channel group $E_3$ is inverted in its operational sign ($\pm$) and is supplied to the filter $\tilde{F}_5$ after increase of the operating rate by the factor 3. The output signal $E_{1,5}$ of the first directional filter lies at the input of the filter $\tilde{F}_5$; $G_1 + G_3 + G_5$ appear at the output in the frequency position already discussed in connection with FIGS. 11 through 13, so that the filter characteristic of the directional filters must thus also be realized accordingly. In the circuit of FIG. 18, the inversion ($\pm$) of the operational sign ensues first for the 12-channel group $E_2$. Both 12-channel groups $E_2$ and $E_4$ are increased in their operating rate by the factor 3 and supplied to the filter $F_4$ (FIGS. 11, 13) at whose output the modulators (x) with a modulation frequency of 144 kHz lie. $E_2$ is supplied to the filter $\tilde{F}_6$ and $E_4$ is supplied to the filter $\tilde{F}_6$, so that the two 12-channel groups $G_2$ and $G_4$ appear at the output in the frequency position according to FIGS. 14 and 15.

Figure 18A:
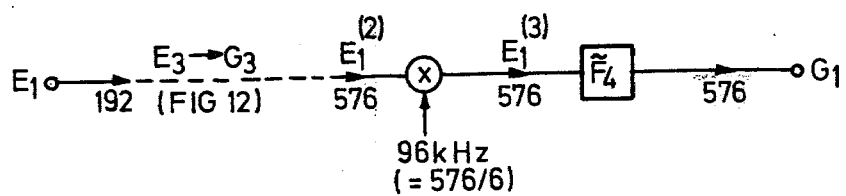
FIG. 18a shows a further arrangement for generating $G_1$ means of the same filter $F_5$ as in FIG. 12.
Figure 18A:
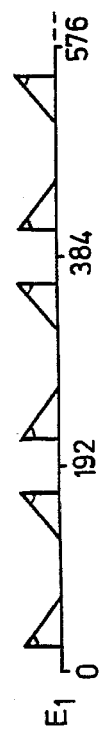
Figure 18A:
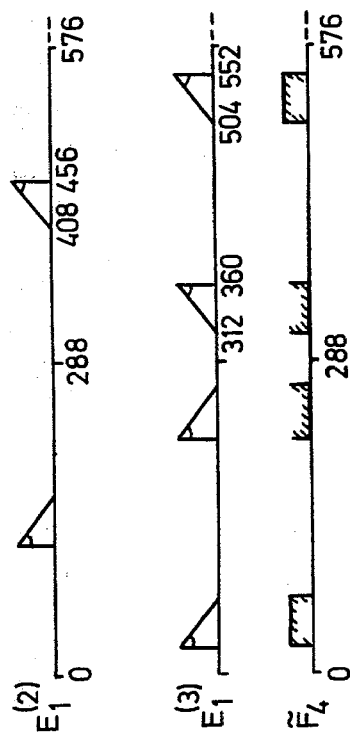
Figure 18A:
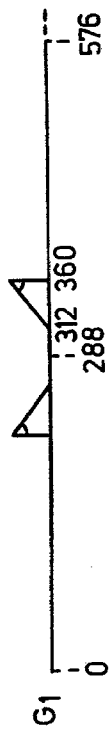
Figure 18B:
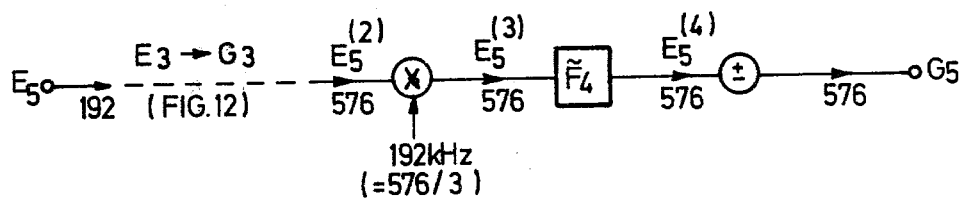
FIG. 18b shows a further arrangement for generating $G_5$ by means of the same filter $F_5$ as in FIG. 12.
Figure 18B:
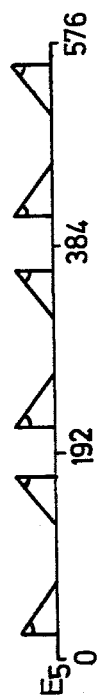
Figure 18B:
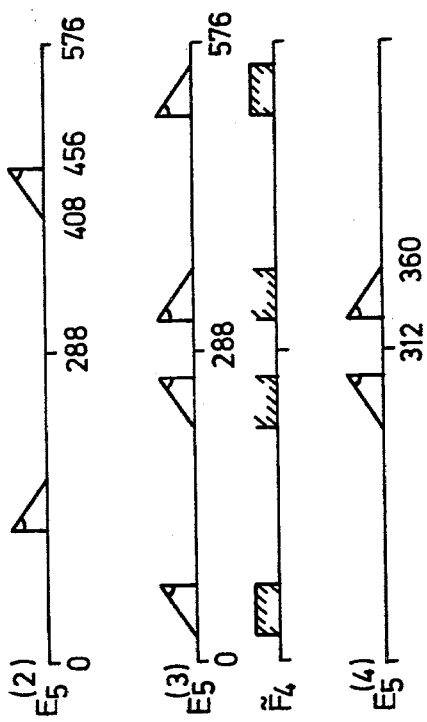
Figure 18B:
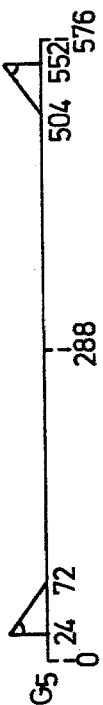

Still further arrangements are illustrated in FIGS. 18a and 18b for converting $E_1$ into $G_1$ or, respectively $E_5$ into $G_5$.

The filter $\tilde{F}_4$ (FIG. 17) is employed to this end, to which filter $\tilde{F}_4$ a modulator (x) with the modulation frequency 96 kHz or, respectively, 192 kHz is pre-connected (96=576/6; 192=576/3). In both circuits, the broken lines indicate the circuit section for generating $G_3$ from $E_3$, according to FIG. 12. For the circuit of FIG. 18b, the operational sign inverter ($\pm$) must be additionally connected to the filter $F_4$.

The fundamental design of the apparatus of FIG. 19 has been discussed above. The 12-channel group E with the operating rate 120 kHz is produced by means of the summation (+) of the channels $A_1$ through $A_{12}$, which are first processed separately. In all channels, the operating rate of 8 kHz is first increased by the factor 3 to 24 kHz and, subsequently, the filter $F_o$ is inserted in each of the channels, the pass-band of this filter again lying between 4 kHz and 8 kHz. Subsequently, the operating rate is increased to 120 kHz, whereby an inversion ($\pm$) of the operational sign of each second sample is previously undertaken for the channels $A_2$, $A_4$, $A_6$, $A_7$, $A_9$ and $A_{12}$. The filters $F_7$ then follow in the channels $A_1$, $A_6$, $A_{11}$; a respective filter $F_8$ follows in the channels $A_2$, $A_5$, $A_7$, $A_{10}$ and $A_{12}$; and a respective filter $F_9$ follows in the channels $A_3$, $A_4$, $A_8$ and $A_9$. A modulator (x) with the modulation frequency 40 kHz is connected in the channels $A_1$, $A_2$, $A_4$, $A_5$, $A_7$, $A_8$, $A_{10}$ and, finally, a modulator (x) with the modulation frequency 20 kHz lies after the filter $F_7$ for the channel $A_{11}$. After traversing the filters $F_9$ or, respectively, $F_7$ or, respectively, $F_8$, the channels $A_3$, $A_6$ and $A_{12}$ are directly conducted to the adder (+), whereas an operational sign inversion ($\pm$) ensues for channel $A_9$ after the filter $F_9$. In the channels provided with modulators (x), additional filters are connected, namely the filters $F_{10}$ for the channels $A_1$ and $A_{11}$, the filters $F_{11}$ for the channels $A_2$ and $A_{10}$, the filters $F_{12}$ for the channels $A_4$ and $A_8$ and the filters $F_{13}$ for the channels $A_5$ and $A_7$. An inversion ($\pm$) of the operational sign also ensues subsequently for the channels $A_7$, $A_8$, $A_{10}$ and $A_{11}$. In FIG. 20, it can be seen that here, too, the filter stop bands and pass band for the filters $F_7$ through $F_{13}$ are selected in such manner that the 12 individual channels appear mirror-symmetrically to the frequency 60 kHz, between the frequencies 8 kHz and 56 kHz in normal position or, respectively, between the frequencies 64 kHz and 112 kHz in inverted position.

FIG. 21 shows directional filters which may be used as modifications for the circuit according to FIG. 19, as already discussed. The filters $\widetilde{F}_{10}$ and $\widetilde{F}_{11}$ employed there have the same pass bands and stop bands as the filters $F_{10}$ and $F_{11}$. In the arrangement illustrated in FIG. 21, the channel $A_1$ is supplied to the filter $\widetilde{F}_{10}$ and the channel $A_{11}$ is supplied to the filter $\widetilde{F}_{10}$, so that the sum of the two channels can be tapped at the output. An additional modulator (x) with the modulation frequency 40 kHz is connected on the input side for channel $A_{11}$. In the sample embodiment likewise illustrated in FIG. 21, channels $A_2$ and $A_5$ are supplied to the directional filter $\widetilde{F}_{11}$ and $\widetilde{\widetilde{F}}_{11}$ and can be tapped on the output side as $A_2 + A_5$. The third arrangement illustrated in FIG. 21 shows the combination of channels $A_{10}$ and $A_7$ in the directional filter $\widetilde{F}_{11}$, $\widetilde{\widetilde{F}}_{11}$, whereby an operational sign inversion ($\pm$) is post-connected to the output. The directional filters employed in FIG. 21 also realize complementary transfer functions.

Figure 22:
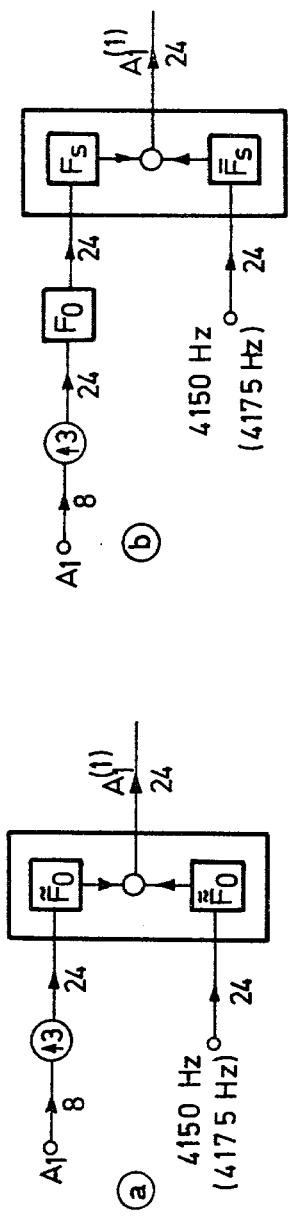
FIG. 22 shows two possible solutions for the introduction of an outband signalizing tone.

The operation of the circuits of FIGS. 22a and 22b is similar. In both cases, the signal tone 4150 Hz (4175 Hz) is directly supplied at the sampling rate 24 kHz to the filters $\widetilde{F}_o$ or, respectively, $\widetilde{F}_s$. In the circuit according to FIG. 22a, the channel $A_1$ is directly conducted to the input of the filter $\widetilde{F}_o$ after increase of the operating rate by the factor 3 to 24 kHz and, in the circuit of FIG. 22b, channel $A_1$ is supplied to the input of the signal filter $F_s$ via the filter $F_o$ after increase of the operating rate by the factor 3 to 24 kHz, so that the channel corresponding to the location $A_1^{(1)}$ appears at the output.

1. A method for digital conversion of signals into signals of a frequency-division multiplex system, comprising the steps of limiting the band width of signals to be converted to a specific band width, and selecting a basic operating rate for generating samples of said signals having a frequency equal to six times said specific band width, selecting further operating rates which are entire multiples of said basic operating rate, forming a 12-channel group given a channel width of 4 kHz and a basic PCM sampling rate of 8 kHz, the operating rate for 12 channels is increased by the factor 3 to 24 kHz, traversing an identical filter, inverting each second scanning sample in its operational sign for some channels, increasing the operating rate for all channels by the factor 5 to 120 kHz and combining the individual channels into a 12-channel group after passing through modulators and filters at an operating rate of 120 kHz.

2. Apparatus for digital conversion of signals into signals of a frequency division multiplex system, comprising; means for forming a 2-channel sub-group at an operating rate of 8 kHz, means for increasing the operating rate for the two channels by the factor 3 to 24 kHz; each channel having a filter whose pass band lies between 4 kHz and 8 kHz, one of said channels having an inverting circuit which inverts the operational sign of every second sample, means for subsequently increasing the operating rate by the factor 2 to 48 kHz in both channels, a plurality of further filters which are identical to one another connected in both channels, a modulator with 16 kHz modulation frequency connected to said channels, and a further circuit for inverting the operational sign for each respective second sample connected to the filter in one said channel, and means for supplying both channels to a summing circuit at an operating rate of 48 kHz.

3. Apparatus according to claim 2, including means connected to said filters for inverting every second scanning sample in its operational sign in the first channel, means for combining both channels, and means for modulating said channels with a frequency of 16 kHz.

4. Apparatus according to claim 2, including a directional filter with complementary transfer functions at whose output the combined channels are modulated with a frequency of 16 kHz, and filter means connected to said modulator.

5. Apparatus according to claim 2, including means for forming a 4-channel sub-group at an operating rate of 96 kHz from two 2-channel sub-groups having a sampling rate of 48 kHz, including means connected in one of said 2-channel sub-groups for inverting the operational sign of every second sample, a plurality of first filters identical to one another and connected in both sub-groups, a modulator with 32 kHz modulation frequency connected to each sub-group, a plurality of identical second filters connected to said modulators, means connected subsequently to said modulator in one said sub-group for inverting the operational sign of every second sample, and means for combining both sub-groups.

6. Apparatus according to claim 2, including means for forming a 4-channel sub-group at an operating rate of 96 kHz from two 2-channel sub-groups having an operating rate of 48 kHz, including means connected in one of said sub-groups for inverting the operational sign of every second sample, a plurality of first identical filters connected to both sub-groups, second means in one said sub-group for inverting the operational sign of every second sample, means for combining both sub-groups, a modulator connected to receive both sub-groups, said modulator having a modulation frequency of 32 kHz, and a second filter connected to the output of said modulator.

7. Apparatus according to claim 2, including means for forming a 4-channel sub-group at an operating rate of 96 kHz from two 2-channel sub-groups each having an operating rate of 48 kHz, including means connected in one of said sub-groupsfor inverting the operational sign of every second sample, a directional filter connected with said two sub-groups, a modulator connected to said directional filter, and a second filter connected to the output of said modulator.

8. Apparatus according to claim 2, including means for generating an 8-channel sub-group at 192 kHz from two 4-channel sub-groups functioning at an operating rate of 96 kHz, including means for inverting the operational sign of every second sample for one 4-channel sub-group, identical filters for both 4-channel sub-groups, each of said sub-groups having a modulator with a modulation frequency of 64 kHz and a second filter connected to said modulator, means connected to the second filter in the second 4-channel sub-group for inverting the operational sign of every second sample, and means for combining said sub-groups.

9. Apparatus according to claim 2, including means for generating an 8-channel sub-group at 192 kHz from two 4-channel sub-groups functioning at an operating rate of 96 kHz, including means for inverting the operational sign of every second sample for one 4-channel sub-group, a first filter in each of said sub-groups, means connected to said first filters for combining said sub-groups, a modulator connected to said combining means, said modulator having a modulation frequency of 64 kHz, and a second filter connected to the output of said modulator.

10. Apparatus according to claim 2, including means for generating an 8-channel sub-group at 192 kHz from two 4-channel sub-groups functioning at an operating rate of 96 kHz including means for increasing the operating rate to 192 kHz, a directional filter connected to said last-named means, a modulator connected to said directional filter functioning at a modulation frequency of 64 kHz, and a second filter connected to said modulator.

11. Apparatus according to claim 2, including means for generating a 12-channel group from two 2-channel sub-groups at the operating rate of 96 kHz, including identical circuits for each sub-group for inverting the operational sign of every second sample as well as for increasing the operating rate by the factor 2, a first filter for each of said 2-channel sub-groups, and means for combining said sub-groups.

12. Apparatus according to claim 11, wherein said first filter for each of said sub-groups comprises a directional filter having transfer functions which are complementary to each other.

13. Apparatus according to claim 2, including means for generating groups at an operating rate of 576 kHz from 12-channel groups at an operating rate of 192 kHz.

14. Apparatus according to claim 13, including individual filters connected with each of said 12-channel groups.

15. Apparatus according to claim 13, including means in one of said 12-channel groups for inverting the operational sign of every second sample.

16. Apparatus according to claim 13, including a modulator having a modulation frequency of 144 kHz for each of said 12-channel groups, a filter connected to each of said modulators, and means for combining said 12-channel groups whereby said individual 12-channel groups appear between the frequencies 312 kHz through 552 kHz in normal position, or in inverted position between the frequencies of 24 kHz and 264 kHz.

17. Apparatus according to claim 2, including means for generatinggroups at an operating rate of 576 kHz, said means including modulator means for modulating said 12-channel groups with a modulating frequency of 144 kHz, directional filter with transfer functions which are complementary to one another for two 12-channel groups, a second directional filter connected to the output of said first directional filter and to a third 12-channel group, whereby the resulting 12-channel groups appear between the frequencies 312 kHz and 552 kHz in normal position or between the frequencies 24 kHz and 264 kHz in inverted position.

18. Apparatus according to claim 2, including means for supplying 12-channel groups with the operating rate 576 kHz to a modulator having a modulation frequency of 96 kHz or 192 kHz, and including a filter connected to said modulator.

19. Apparatus for digital conversion of signals within a 4 kHz band width into signals of a frequency division multiplex system, comprising; means for producing PCM signal samples at 8 kHz, means for increasing the operating rate to 24 kHz, an identical filter in each channel, means in at least one channel for inverting the operational sign of every second scanning sample, means for increasing the work rate to 120 kHz, a plurality of modulators connected individually in said channels, a plurality of filters connected individually with said modulators, and combining means for summing said channels into a 12-channel group, said combining means including a directional filter for combining two of said channels.

20. Apparatus according to claim 2, including a directional filter with transfer functions which are complementary to one another for combining an audio channel and the outband signal at 4150 Hz or 4175 Hz, said signals being combined at an operating rate of 24 kHz, and including an additional signal filter directly connected in the audio channel at the input of said directional filter.

* * * * *